US012213541B2

(12) United States Patent
Lubets et al.

(10) Patent No.: US 12,213,541 B2
(45) Date of Patent: Feb. 4, 2025

(54) ASYMMETRIC ATHLETIC APPAREL AND METHODS OF USE THEREFOR

(71) Applicant: New Balance Athletics, Inc., Boston, MA (US)

(72) Inventors: Andrew Lubets, Acton, MA (US); Nicholas Raymond, Swampscott, MA (US)

(73) Assignee: New Balance Athletics, Inc., Boston, MA (US)

( * ) Notice: Subject to any disclaimer, the term of this patent is extended or adjusted under 35 U.S.C. 154(b) by 779 days.

(21) Appl. No.: 16/220,953

(22) Filed: Dec. 14, 2018

(65) Prior Publication Data

US 2019/0166797 A1    Jun. 6, 2019
US 2024/0074411 A9    Mar. 7, 2024

Related U.S. Application Data

(63) Continuation of application No. 13/773,104, filed on Feb. 21, 2013, now Pat. No. 10,188,156.
(Continued)

(51) Int. Cl.
*A41D 13/08*     (2006.01)
*A01K 15/02*     (2006.01)
(Continued)

(52) U.S. Cl.
CPC ......... *A41D 13/0015* (2013.01); *A01K 15/02* (2013.01); *A41D 13/08* (2013.01);
(Continued)

(58) Field of Classification Search
CPC ............ A41D 13/0512; A41D 13/0518; A41D 13/05; A41D 2400/80; A41D 2400/32
See application file for complete search history.

(56) References Cited

U.S. PATENT DOCUMENTS 3,801,987 A    4/1974 Thompson, Jr.
4,625,336 A    12/1986 Derderian
(Continued)

FOREIGN PATENT DOCUMENTS

CN    101351129 A    1/2009
CN    101731768 A    6/2010
(Continued)

OTHER PUBLICATIONS

International Preliminary Report on Patentability and Written Opinion in PCT/US2013/027106 dated Aug. 26, 2014 7 pages.
(Continued)

*Primary Examiner* — Katharine G Kane
(74) *Attorney, Agent, or Firm* — Goodwin Procter LLP

(57) ABSTRACT

The invention relates to apparel and methods for supporting a movement of an athlete during an asymmetrical athletic motion. An example asymmetric garment for at least a portion of a body of a wearer includes a first material portion and a second material portion, with the first material portion and second material portion being arranged asymmetrically with respect to a central vertical plain of the garment, and with the second material being adapted to provide a lesser resistance to at least one of stretching or twisting than the first material to reduce resistance to a movement of the wearer during an asymmetrical athletic motion.

23 Claims, 20 Drawing Sheets

Related U.S. Application Data

(60) Provisional application No. 61/601,252, filed on Feb. 21, 2012.

(51) Int. Cl.
| | |
|---|---|
| *A41D 13/00* | (2006.01) |
| *A41D 27/10* | (2006.01) |
| *A41D 31/18* | (2019.01) |
| *A63B 21/00* | (2006.01) |
| *A63B 71/12* | (2006.01) |
| *A01K 27/00* | (2006.01) |
| *A41D 27/12* | (2006.01) |

(52) U.S. Cl.
CPC ............ *A41D 31/18* (2019.02); *A01K 27/009* (2013.01); *A41D 27/10* (2013.01); *A41D 27/12* (2013.01); *A41D 31/185* (2019.02); *A63B 21/4005* (2015.10); *A63B 21/4007* (2015.10); *A63B 21/4025* (2015.10); *A63B 71/12* (2013.01)

(56) References Cited

U.S. PATENT DOCUMENTS

| | | | |
|---|---|---|---|
| 4,649,573 A | | 3/1987 | Yen |
| 4,937,883 A | | 7/1990 | Shirai |
| 5,035,001 A | * | 7/1991 | Novick ............... A41D 31/065 2/125 |
| 5,109,546 A | | 5/1992 | Dicker |
| 5,469,581 A | | 11/1995 | Uthoff |
| 5,978,966 A | | 11/1999 | Dicker et al. |
| 6,047,405 A | | 4/2000 | Wilkinson |
| 6,047,406 A | | 4/2000 | Dicker et al. |
| 6,202,216 B1 | | 3/2001 | Watanabe et al. |
| 6,353,934 B1 | | 3/2002 | Tada et al. |
| 6,671,884 B1 | | 1/2004 | Griesbach, III et al. |
| 6,892,396 B2 | | 5/2005 | Uno et al. |
| 7,631,367 B2 | | 12/2009 | Caillibotte et al. |
| 7,908,670 B2 | | 3/2011 | Semba et al. |
| 7,913,323 B2 | | 3/2011 | Takamoto et al. |
| 7,937,771 B2 | | 5/2011 | Mazzarolo |
| 2004/0158911 A1 | * | 8/2004 | Amnuel ............... A41B 9/06 2/115 |
| 2007/0074328 A1 | | 4/2007 | Melhart et al. |
| 2008/0229473 A1 | | 9/2008 | Baron et al. |
| 2008/0250553 A1 | | 10/2008 | Gatto et al. |
| 2008/0295216 A1 | | 12/2008 | Nordstrom et al. |
| 2009/0265828 A1 | | 10/2009 | Semba et al. |
| 2010/0077527 A1 | | 4/2010 | Lee et al. |
| 2010/0088798 A1 | | 4/2010 | Forman et al. |
| 2010/0218298 A1 | | 9/2010 | Stattelmann et al. |
| 2011/0209263 A1 | | 9/2011 | Suzuki et al. |
| 2012/0311760 A1 | * | 12/2012 | Puni ............... A41D 13/0512 2/69 |
| 2014/0208479 A1 | | 7/2014 | Lambertz |

FOREIGN PATENT DOCUMENTS

| | | |
|---|---|---|
| DE | 202011050261 U1 | 8/2012 |
| JP | 48361002 | 5/1971 |
| JP | 48361301 | 5/1971 |
| JP | 2007023467 A | 2/2007 |
| JP | 2010144283 A | 7/2010 |
| JP | 2011021291 | 2/2011 |

OTHER PUBLICATIONS

Chinese Office Action in CN201380021026.8 dated Jul. 31, 2015 5 pages.
Preliminary Notice of Reasons for Rejection in Japanese Patent Application No. 2014-557887, dated Feb. 28, 2017 (5 pages).
English Translation of Office Action in connection with Chinese Patent Application Number CN201710252576.0 dated Feb. 24, 2018, 13 pages.

* cited by examiner

PRIOR ART

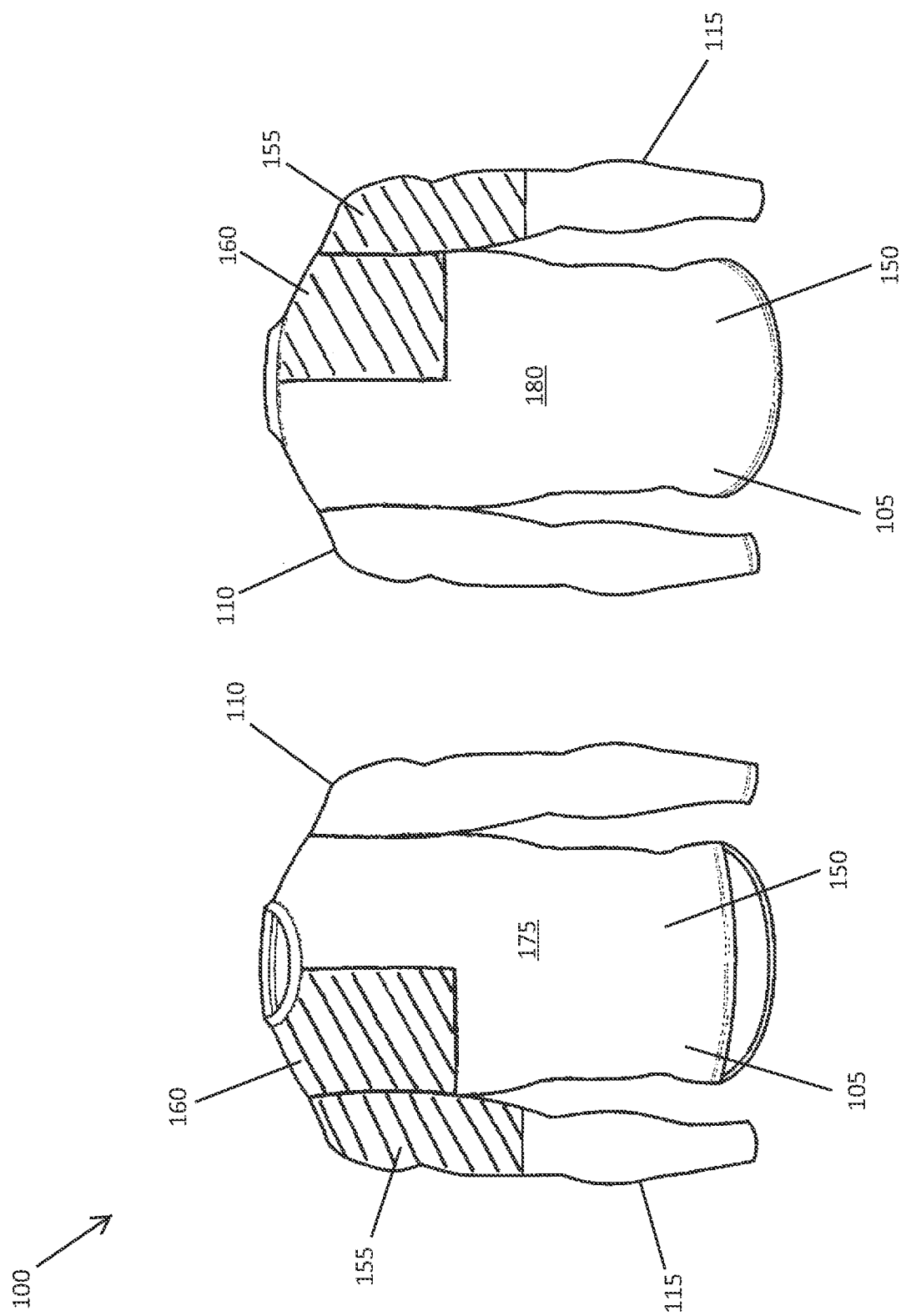

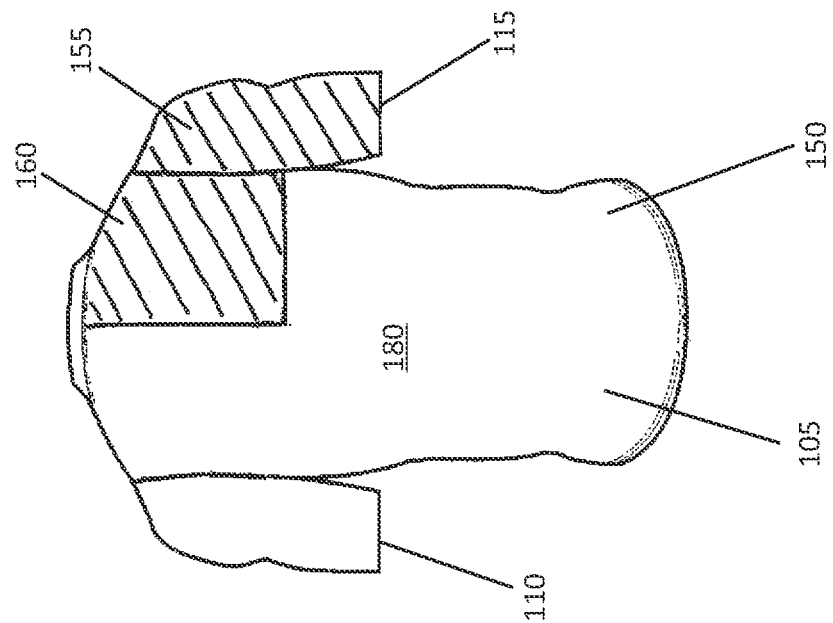
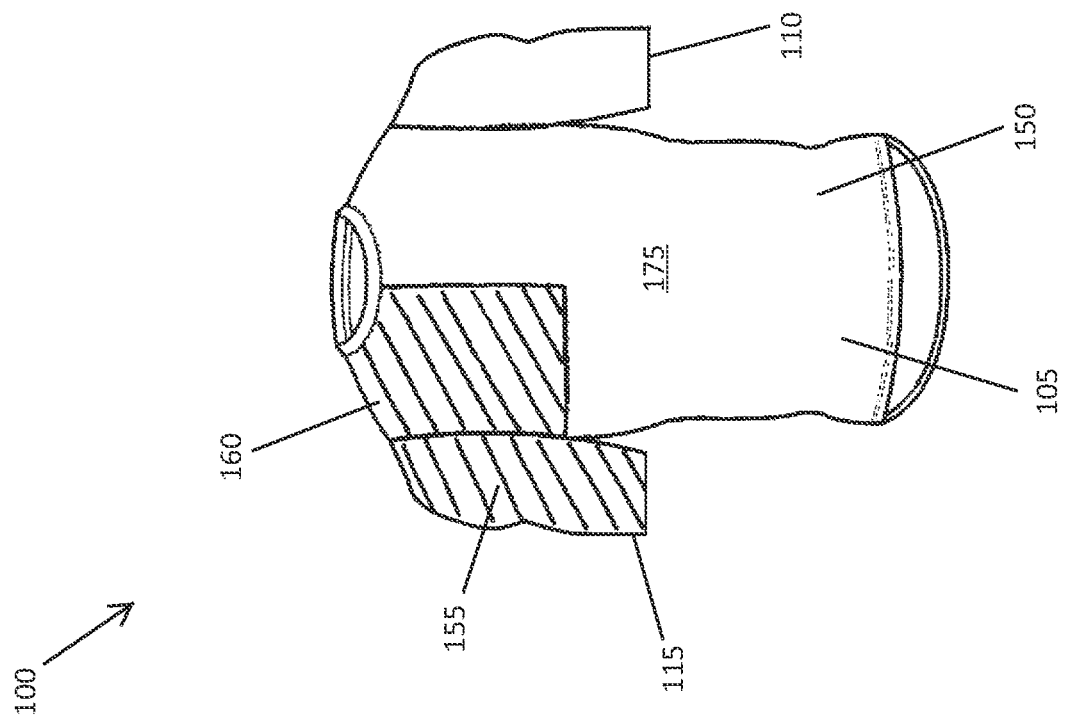
FIG. 4A
FIG. 4B

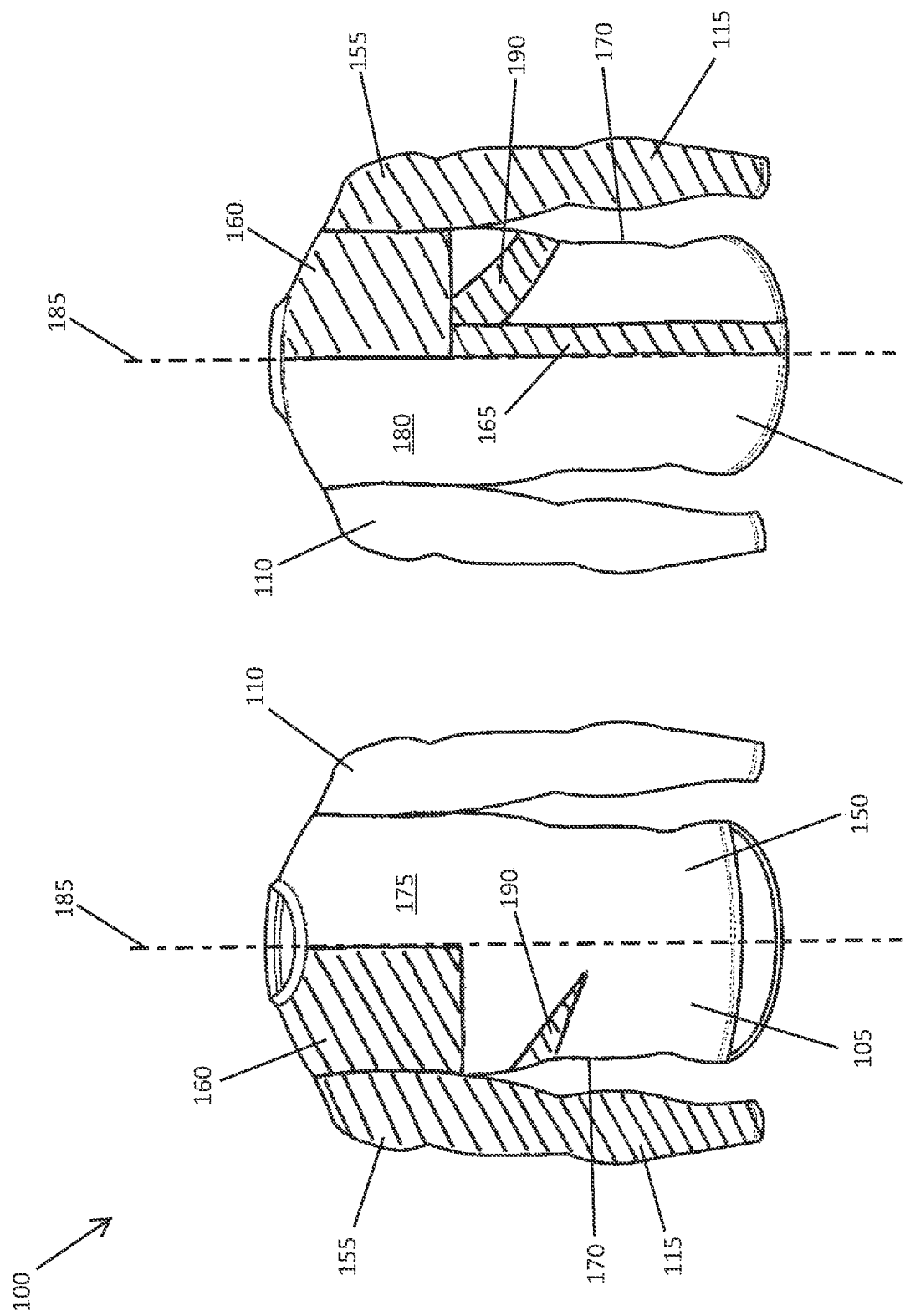

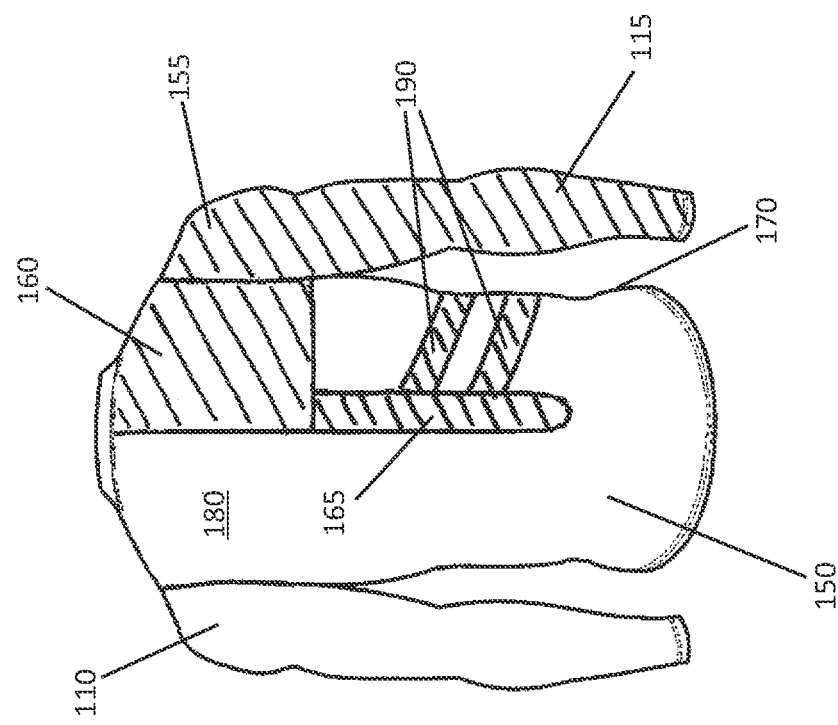
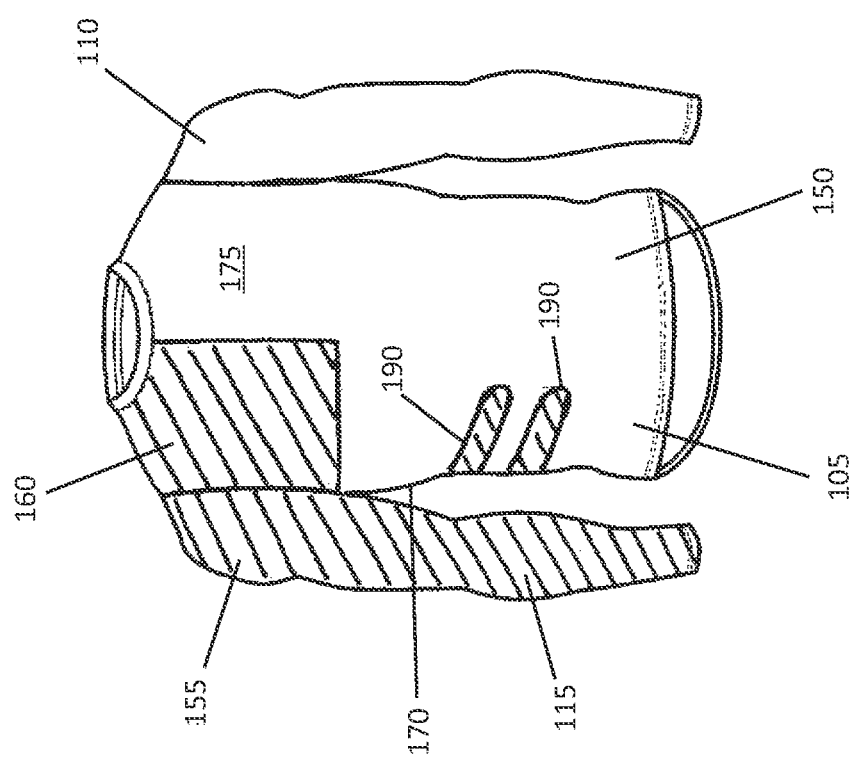

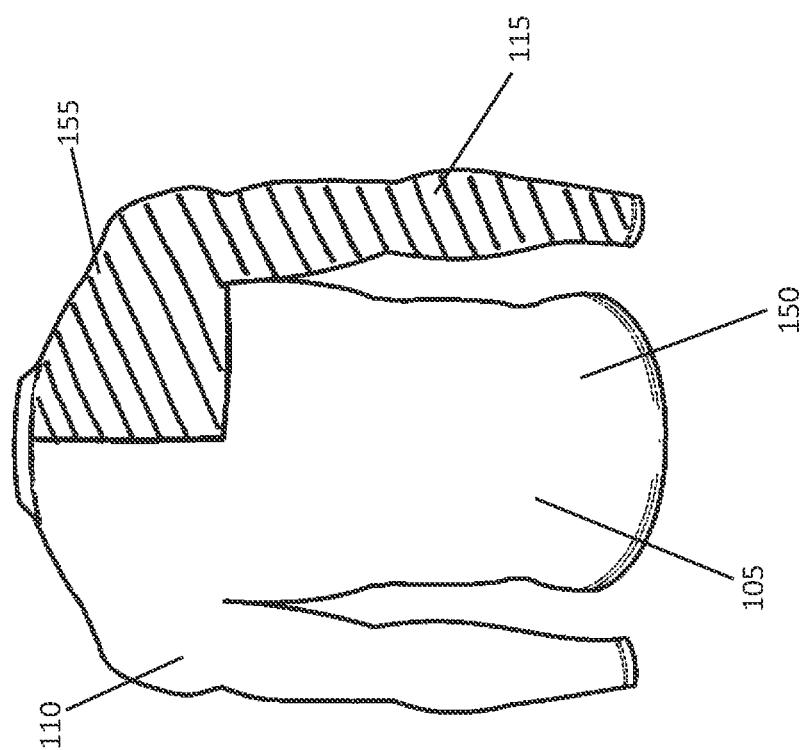
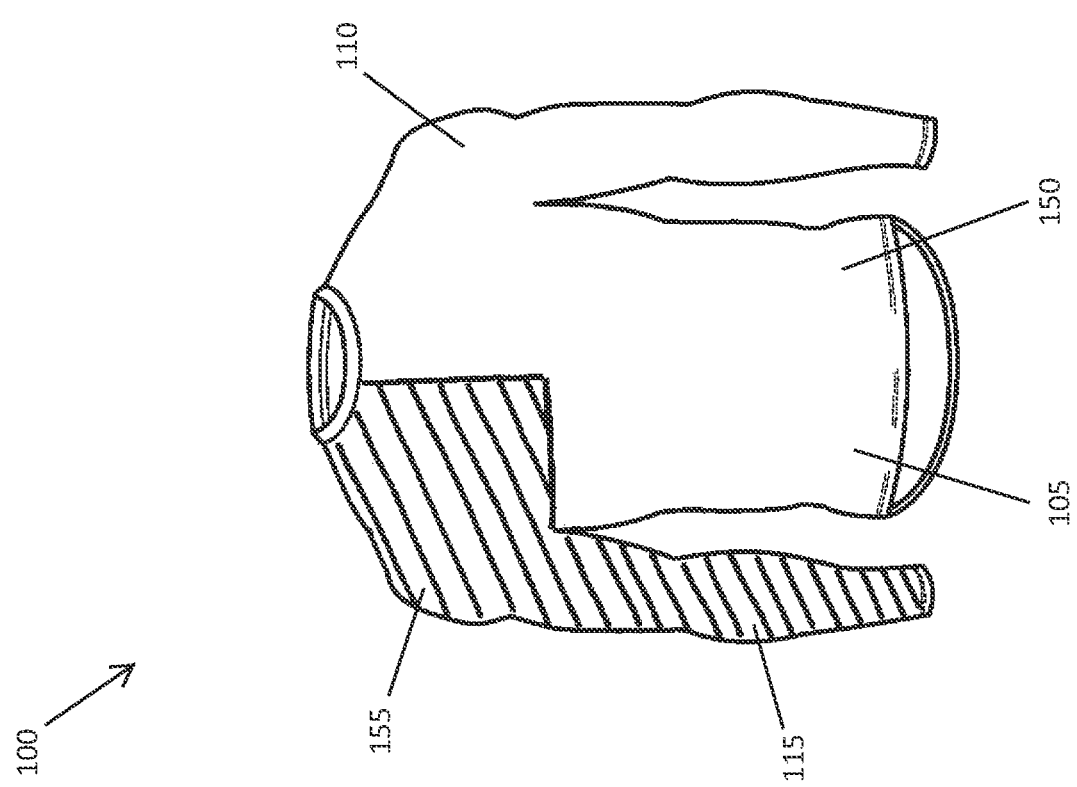

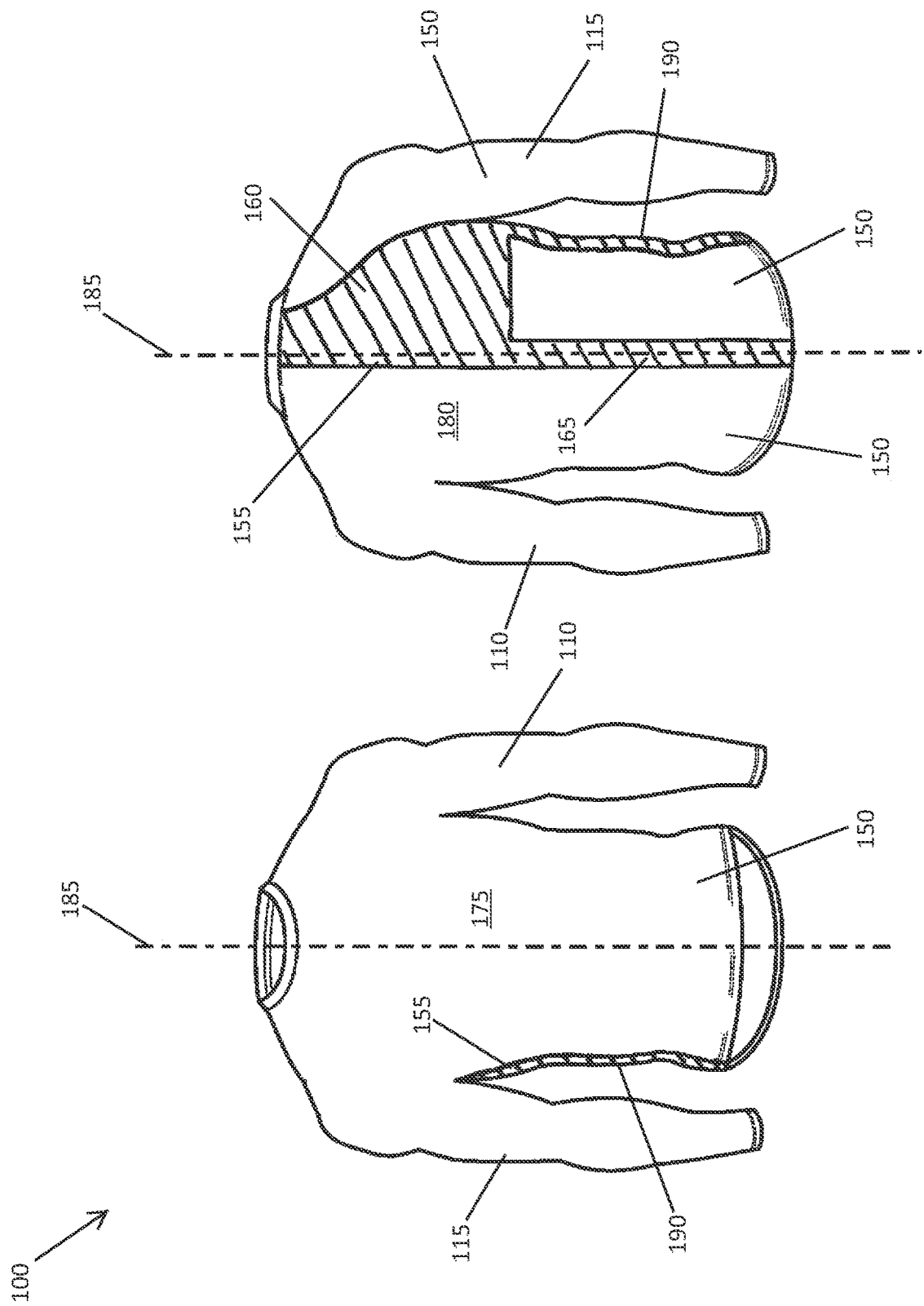

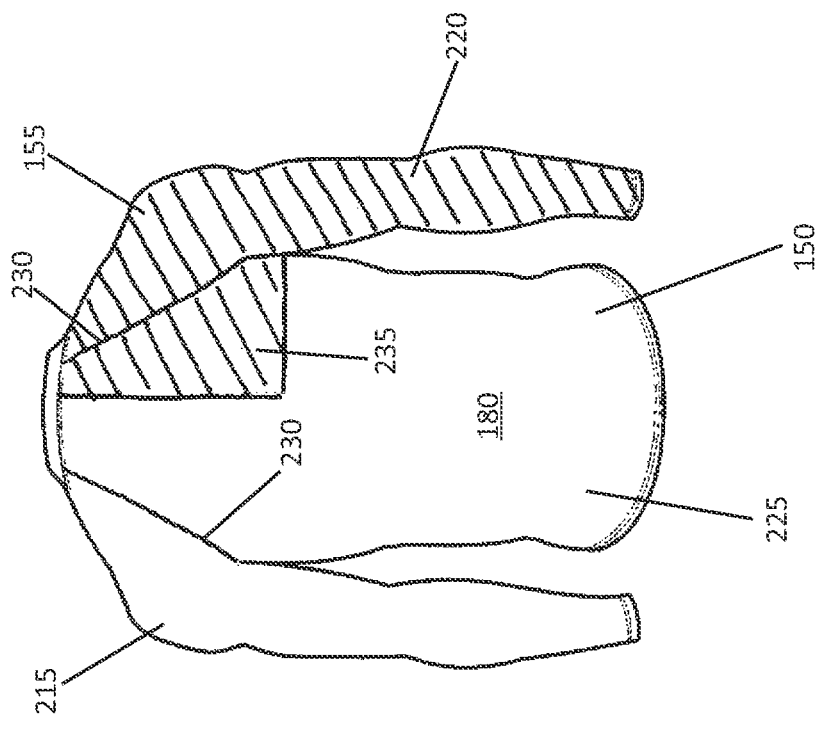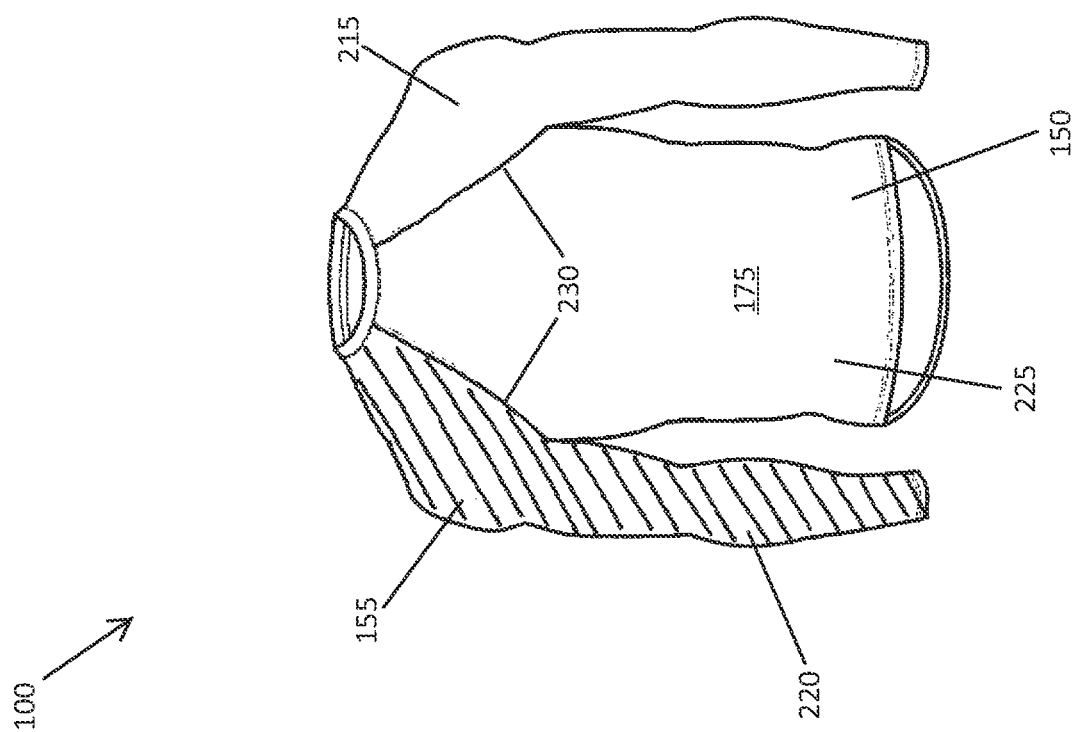
FIG. 12B
FIG. 12A

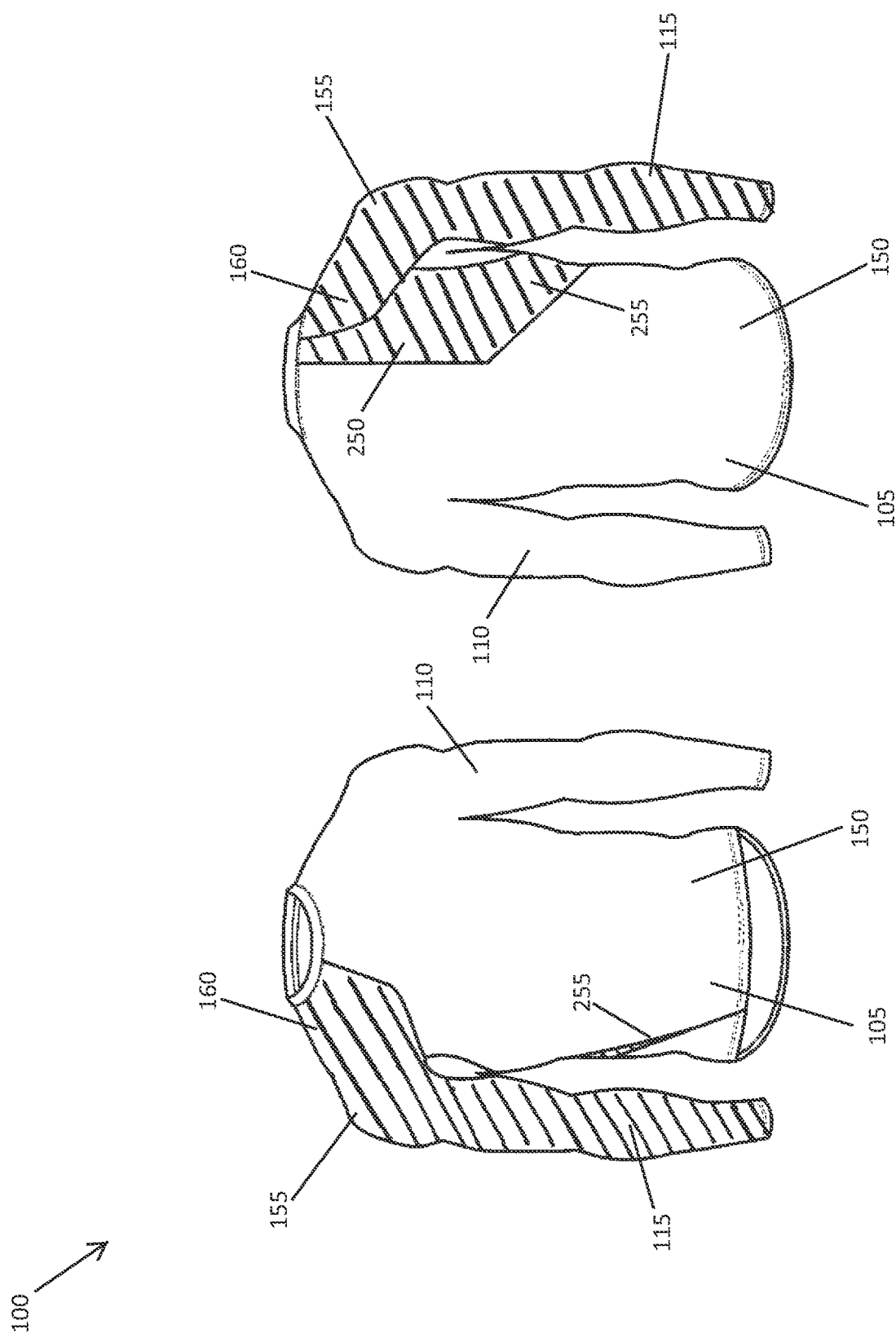

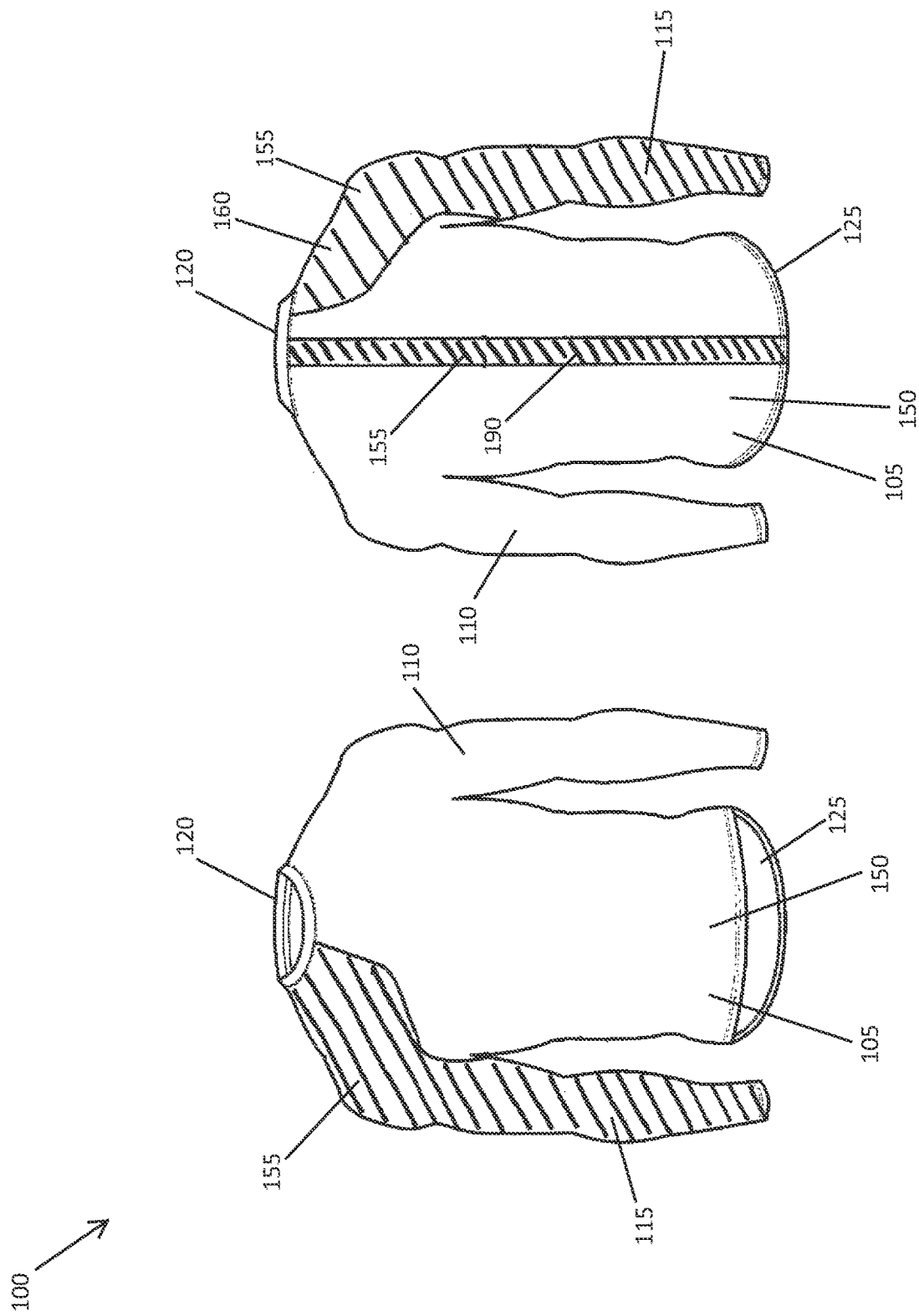

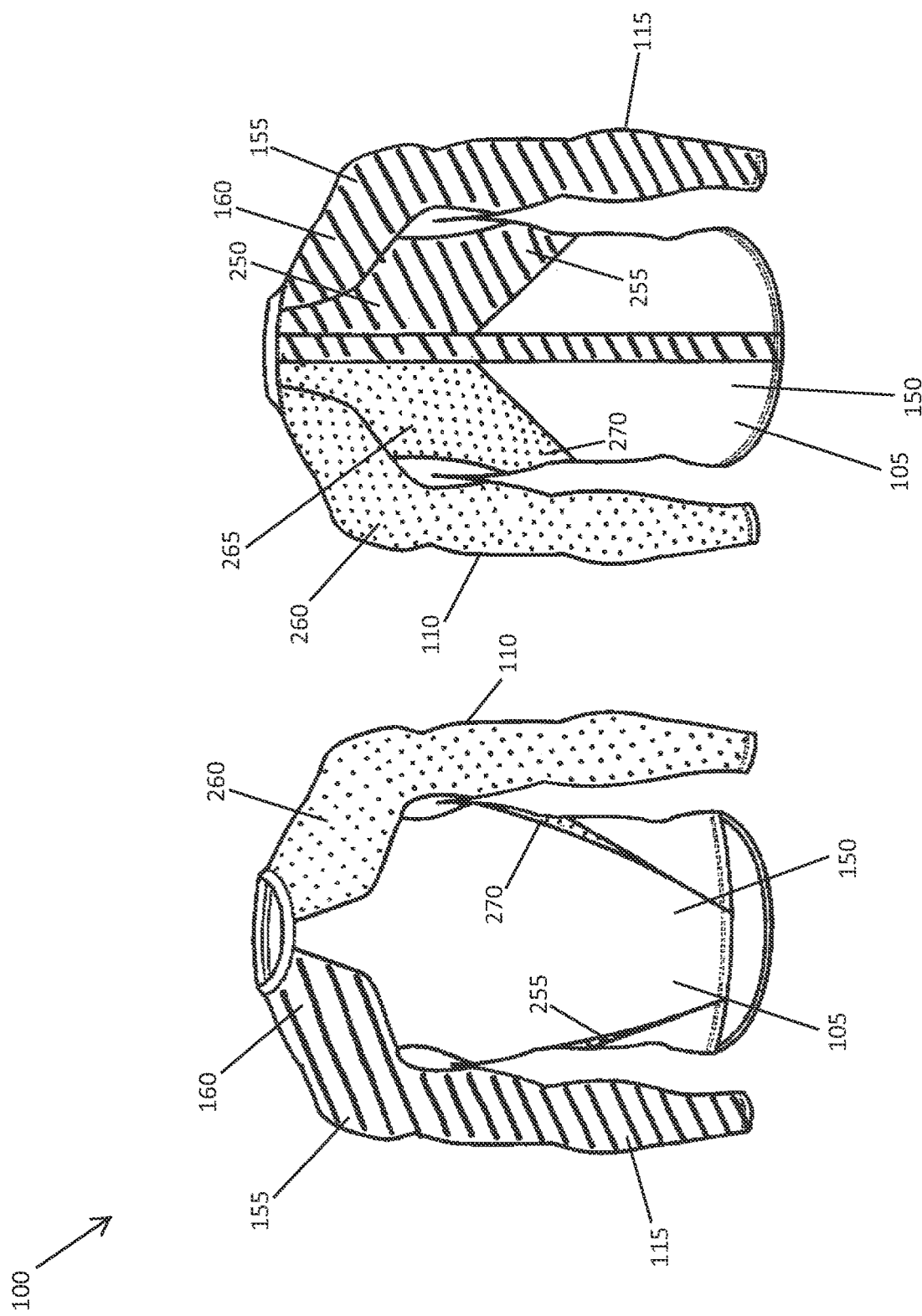

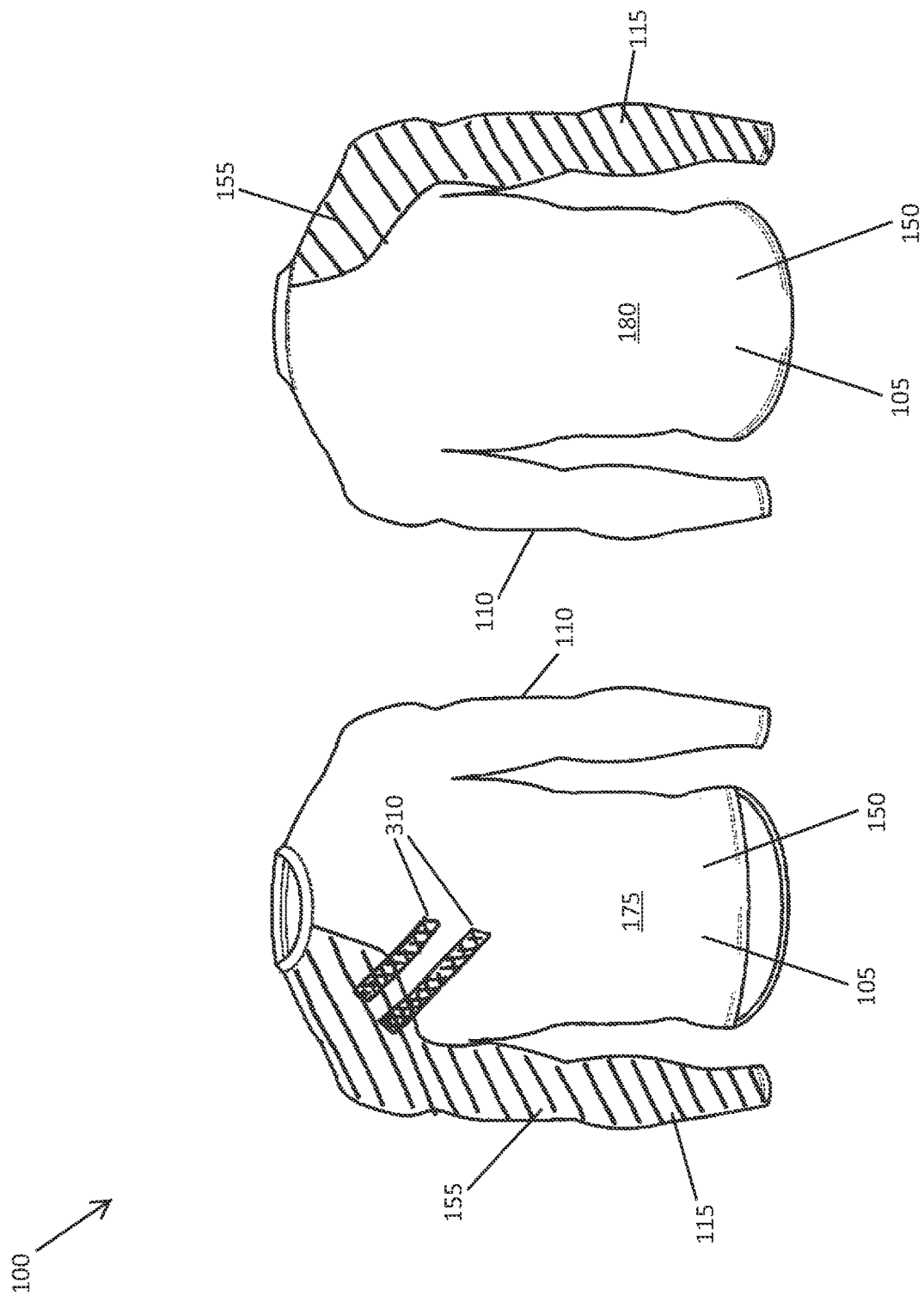

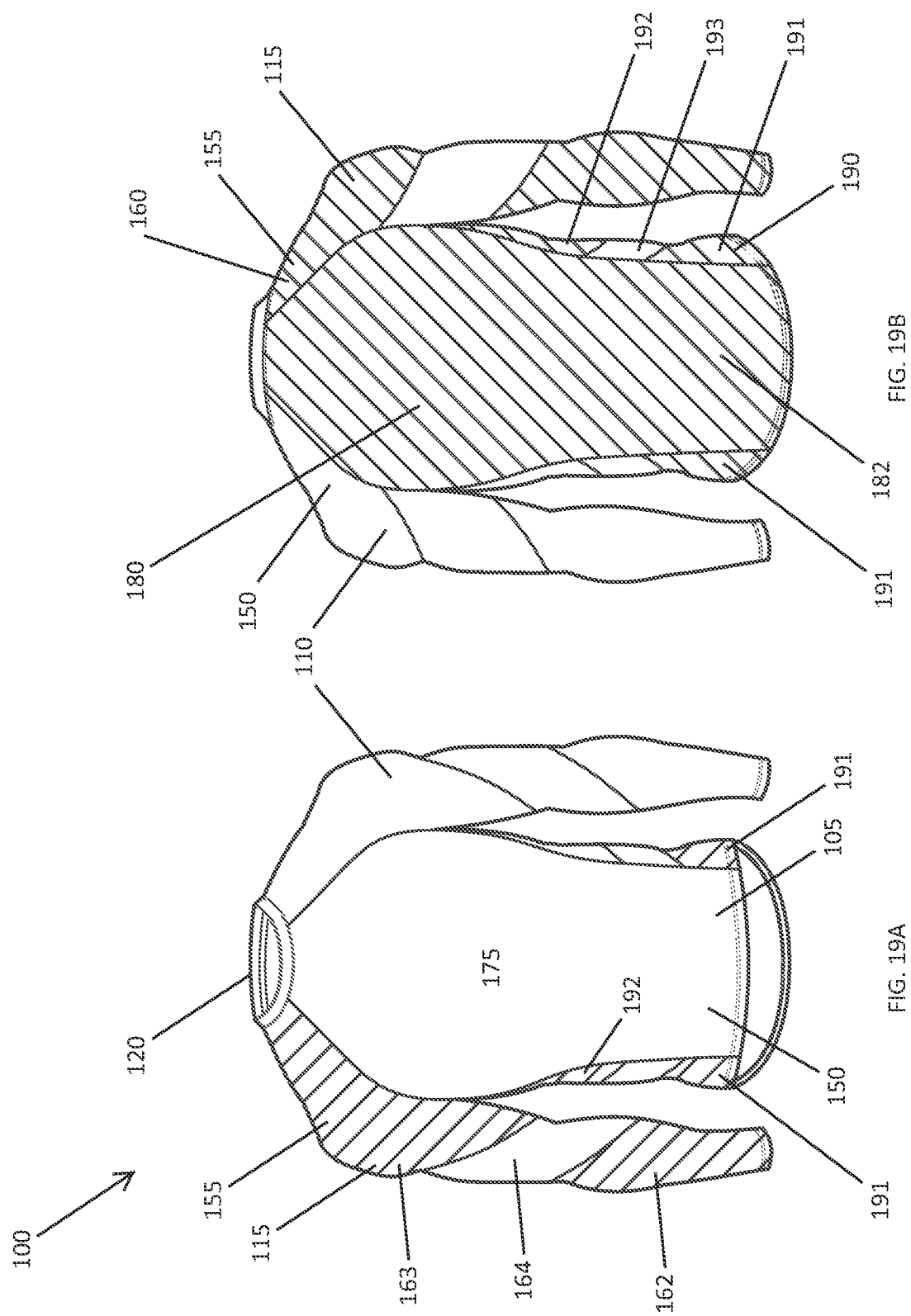

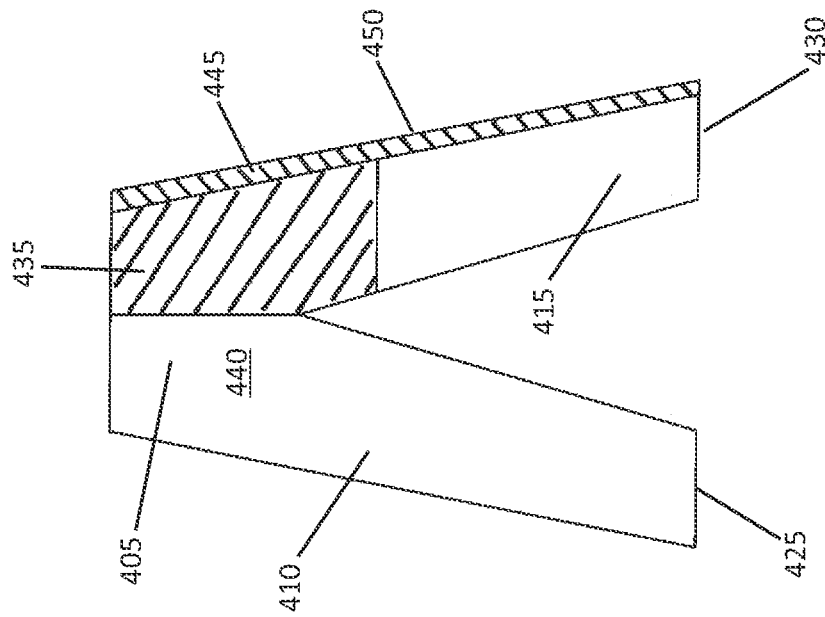
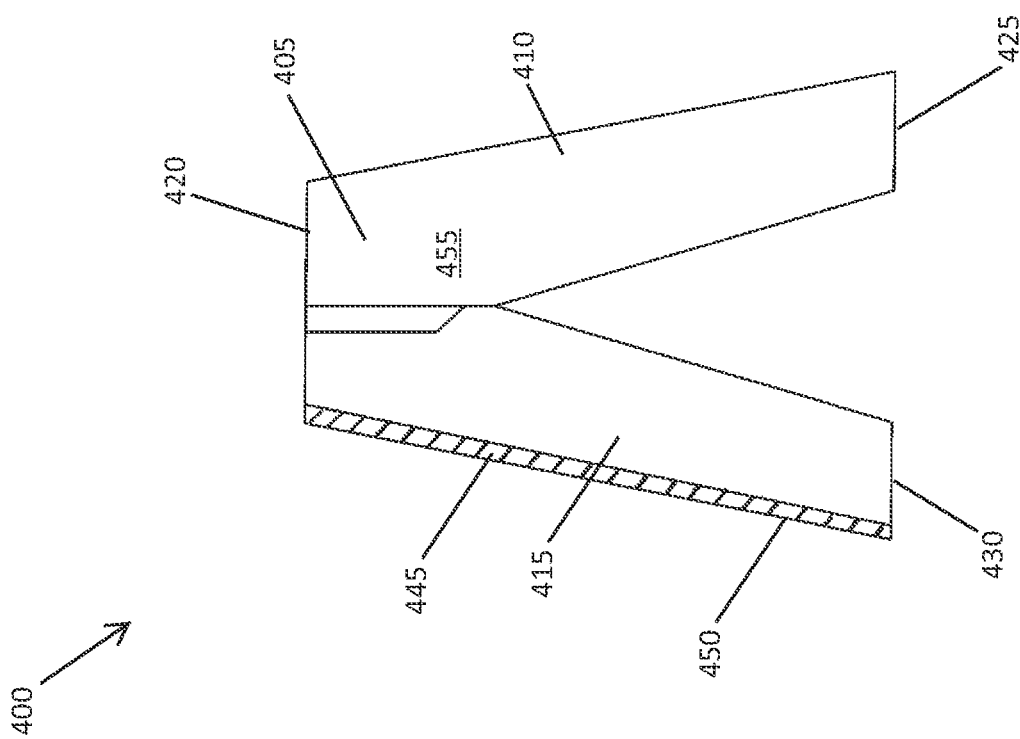

ASYMMETRIC ATHLETIC APPAREL AND METHODS OF USE THEREFOR

CROSS-REFERENCE TO RELATED APPLICATIONS

This application is a continuation of and claims priority to and the benefit of U.S. patent application Ser. No. 13/773,104, filed on Feb. 21, 2013, which claims priority to and the benefit of U.S. Provisional Patent Application Ser. No. 61/601,252, filed Feb. 21, 2012, the disclosures of which are incorporated herein by reference in their entireties.

FIELD OF THE INVENTION

The present invention relates generally to the field of athletic apparel, and more particularly to a garment for supporting a movement of an athlete during an asymmetrical athletic motion.

BACKGROUND OF THE INVENTION

Many movements carried out by an athlete during athletic activity may be considered to be somewhat symmetric in nature, in that the actions are carried out in a similar manner by both the left and right sides of the athlete. For example, actions such as running, skating, cycling, or paddling a kayak in a straight line generally entail similar, if mirrored, motions by the left and right sides of the athlete, with substantially the same range of movement and force generated by each side of the athlete with each movement.

Numerous sports however include motions that can be considered to be highly asymmetric in their execution as they may, for example, be performed or controlled mainly, or only, by a dominant hand of the athlete and/or be performed in a strictly asymmetrical manner. For example, when shooting, an ice hockey player will generally only strike the puck with either a left-handed swing or a right-handed swing, a golfer will generally only perform a swing as either a left-handed swing or a right-handed swing, the majority of baseball batters will generally only swing the bat as either a left-handed swing or a right-handed swing, a racquet sport player will generally only hold and/or control their racquet with their dominant arm, speed skaters tend to swing only one arm when circling a track, a soccer player often favors one foot over the other when striking the ball, football punters and kickers generally only strike the ball with their dominant foot, and football quarterbacks and baseball and softball pitchers generally only throw with their dominant arm. Examples of asymmetric athletic movements can be seen in FIGS. 1A-1D.

For all these asymmetric athletic movements and activities the garments traditionally worn by the athlete, which are generally manufactured symmetrically (i.e., with the same materials, stitching, and design on both the left and right side), can restrict or otherwise working against the asymmetric movement of the wearer. For example, due to their symmetric construction, shirts worn by an ice hockey player may not stretch and deform in a manner optimal to the support of a repeated striking of the puck by either a left-handed or right-handed player. In fact, by failing to account for the specific repeated movements of an athlete carrying out an asymmetric-type motion, traditional garments may, in fact, resist the motion of the wearer (e.g., by providing resistance to the specific stretching of the garment produced by the asymmetric motion) and reduce the efficiency of the motion. For ice hockey and golf, for example, by acting against either or both of the backswing and forward swing of the motion (by inhibiting the range of the swing and/or partially counteracting the force generated by the swing) this resistance applied by the shirt could have a noticeable effect on the power and accuracy of the athlete's swing and shot. By failing to account for a repeated stretching or deformation of the garment in a particular direction, symmetrically manufactured garments may also be prone to wearing and ultimately tearing or otherwise failing at or near the location of the repeated stretch/deformation.

SUMMARY OF THE INVENTION

From the above, there is a need for a garment specifically adapted to reduce the resistance garment material applies to a wearer during asymmetric athletic motions, thereby increasing the efficiency of the asymmetric movement and, for example, facilitating an increase in the force an athlete can generate during the movement. As such, the present invention is directed towards improved garments, and associated methods of design, manufacture and use, for supporting a movement of an athlete during an asymmetrical athletic motion.

One aspect of the invention includes an asymmetric garment for at least a portion of an upper body of a wearer including a torso section having a neck opening for a wearer's neck and a torso opening for a lower portion of the wearer's torso, a first sleeve for covering at least a portion of a first arm of the wearer, the first sleeve adjoining the torso section at a first end thereof and having an opening for a wearer's hand to extend through at a second end thereof, and a second sleeve for covering at least a portion of a second arm of the wearer, the second sleeve adjoining the torso section at a first end thereof and having an opening for a wearer's hand to extend through at a second end thereof. The garment further includes a first material portion including, or consisting essentially of, at least a portion of the first sleeve and at least a portion of the torso section, wherein the first material portion includes, or consists essentially of, a first material. The garment also includes a second material portion including, or consisting essentially of, at least a portion of the second sleeve and at least a portion of the torso section proximate the second sleeve, wherein the second material portion includes, or consists essentially of, a second material adapted to provide a lesser resistance to stretching than the first material to reduce resistance to a movement of the wearer during an asymmetrical athletic motion.

In one embodiment, the second material portion further includes a rear section of the torso section which may extend substantially vertically down the rear section from the neck opening towards, and possibly to, the torso opening. In one embodiment the second material portion includes a side section extending around at least a portion of a side of the torso section proximate the second sleeve, wherein the side section may, for example, extend helically downwards from a rear of the torso section to a front of the torso section. The second material portion can include a unitary expanse of the second material or a plurality of sections of second material connected to form a continuous expanse. The second material portion may also include a plurality of spaced apart material portions.

The first sleeve and the second sleeve may include a raglan sleeve. The first material portion may be stitched to the second material portion by a flat-lock stitch which may, for example, include a nylon thread. In one embodiment, the first material includes a material adapted to provide at least one of a wicking property and cooling property. The first material may include, or consist essentially of, cotton, polyester, nylon, spandex, or a combination of two or more of those materials (e.g., a cotton-spandex blend, a polyester-spandex blend, and/or a nylon-spandex blend), and may, for example, include polyester or nylon with spandex for super stretch and recovery in either a circular knit or warp knit construction. The second material may also include, or consist essentially of, cotton, polyester, nylon, spandex, or a combination of two or more of those materials (e.g., a cotton-spandex blend, a polyester-spandex blend, and/or a nylon-spandex blend), and may, for example, include polyester or nylon with spandex for super stretch and recovery in either a circular knit or warp knit construction. The second material may be formed from a different material or combination of materials from the first material and/or be formed with different proportions, weaves, and/or orientations of materials from the first material. In one embodiment, the first and second materials comprise cotton-spandex, polyester-spandex, or nylon-spandex blends with different proportions of spandex therein. In one embodiment, the second material is adapted to preferentially stretch in a limited number of directions and, for example, in only one direction.

In one embodiment, the garment includes a third material portion, wherein the third material portion includes, or consists essentially of, at least a portion of the first sleeve and at least a portion of the torso section proximate the first sleeve. The third material portion may include, or consist essentially of, the first material or a different third material. The third material portion may also include at least one of a rear section extending substantially vertically down a rear of the torso section and a side section extending helically around at least a portion of a side of the torso section proximate the first sleeve. The third material portion may be arranged either substantially symmetrically or asymmetrically with the second material portion about a central vertical axis of the garment.

One embodiment of the garment may include one or more supporting elements extending over or underlying at least a portion of the garment and, for example, at least one shoulder or elbow of the garment. The one or more supporting elements may include one or more reinforcement elements of, for example, the first material, the second material, or a different third material. The one or more supporting elements may include one or more non-slip material, such as polymeric elements, on an outer surface of the garment, and the non-slip elements may include, or consist essentially of, silicone or rubber or other such materials with a similar performance.

The garment may include one or more elasticity elements adapted to support a movement of the wearer during the asymmetrical athletic motion. The one or more elasticity elements may, for example, be disposable on a first area of the garment to store energy by elastic elongation under a first movement of a portion of the body of the wearer and to release the stored energy under a second movement of the portion of the body in substantially an opposite direction.

Another aspect of the invention includes a method of supporting a movement of an athlete during an athletic motion. The method may include identifying a body portion of an athlete subject to resistance to a movement of the body portion by an article of apparel worn by the athlete during an asymmetrical athletic motion, and providing an asymmetric garment adapted to reduce the resistance to the movement of the body portion during the athletic motion. The garment includes a first material portion including, or consisting essentially of, a first portion of the garment, wherein the first material portion includes, or consists essentially of, a first material. The garment also includes a second material portion including, or consisting essentially of, a second portion of the garment, wherein the second material portion includes, or consists essentially of, a second material adapted to provide a lesser resistance to stretching than the first material, and wherein the second portion of the garment at least partially covers the body portion subject to resistance.

In one embodiment, the asymmetric garment includes a torso section having a neck opening for a wearer's neck and a torso opening for a lower portion of the wearer's torso, a first sleeve for covering at least a portion of a first arm of the wearer, the first sleeve adjoining the torso section at a first end thereof and having an opening for a wearer's hand to extend through at a second end thereof, and a second sleeve for covering at least a portion of a second arm of the wearer, the second sleeve adjoining the torso section at a first end thereof and having an opening for a wearer's hand to extend through at a second end thereof. The first material portion may include the first sleeve and at least a first portion of the torso section, and the second material portion may include at least a portion of the second sleeve and at least a second portion of the torso portion proximate the second sleeve.

Another aspect of the invention includes an asymmetric garment for at least a portion of a lower body of a wearer. The garment includes a torso section having a torso opening for a lower portion of the wearer's torso, a first leg section for covering at least a portion of a first leg of the wearer, the first leg section connected to the torso section at a first end thereof and having an opening for a wearer's foot to extend through at a second end thereof, and a second leg section for covering at least a portion of a second leg of the wearer, the second leg section connected to the torso section at a first end thereof and having an opening for a wearer's foot to extend through at a second end thereof. The garment further includes a first material portion including, or consisting essentially of, at least a portion of the first leg section and at least part of the torso section, wherein the first material portion includes a first material. The garment also includes a second material portion including, or consisting essentially of, at least a portion of the second leg section and at least a portion of the torso section proximate the second leg section, wherein the second material portion includes a second material adapted to provide a lesser resistance to stretching than the first material to reduce resistance to a movement of the wearer during an asymmetrical athletic motion.

A further aspect of the invention includes an asymmetric garment for at least a portion of a body of a wearer including a first material portion forming a first portion of the garment, wherein the first material portion comprises a first material, and a second material portion forming a second portion of the garment, wherein the second material portion comprises a second material. The first material portion and second material portion are arranged asymmetrically with respect to a central vertical plain of the garment, with the second material being adapted to provide a lesser resistance to at least one of stretching or twisting than the first material to reduce resistance to a movement of the wearer during an asymmetrical athletic motion.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 3A is a front view of another long-sleeved asymmetric garment for the upper body of a wearer, in accordance with one embodiment of the invention;

FIG. 3B is a rear view of the asymmetric garment of FIG. 3A;

FIG. 4A is a front view of a short-sleeved asymmetric garment for the upper body of a wearer, in accordance with one embodiment of the invention;

FIG. 4B is a rear view of the asymmetric garment of FIG. 4A;

FIG. 6A is a front view of another long-sleeved asymmetric garment for the upper body of a wearer, in accordance with one embodiment of the invention;

FIG. 6B is a rear view of the asymmetric garment of FIG. 6A;

FIG. 7A is a front view of another asymmetric garment for the upper body of a wearer, in accordance with one embodiment of the invention;

FIG. 7B is a rear view of the asymmetric garment of FIG. 7A;

FIG. 8A is a front view of an asymmetric garment for the upper body of a wearer having a unitary expanse of second material, in accordance with one embodiment of the invention;

FIG. 8B is a rear view of the asymmetric garment of FIG. 8A;

FIG. 11A is a front view of an asymmetric garment for the upper body of a wearer having an expanse of second material extending only on a rear and side of the garment, in accordance with one embodiment of the invention;

FIG. 11B is a rear view of the asymmetric garment of FIG. 11A;

FIG. 12A is a front view of an asymmetric garment for the upper body of a wearer having raglan sleeves, in accordance with one embodiment of the invention;

FIG. 12B is a rear view of the asymmetric garment of FIG. 12A;

FIG. 13A is a front view of another asymmetric garment for the upper body of a wearer, in accordance with one embodiment of the invention;

FIG. 13B is a rear view of the asymmetric garment of FIG. 13A;

FIG. 14A is a front view of another asymmetric garment for the upper body of a wearer, in accordance with one embodiment of the invention;

FIG. 14B is a rear view of the asymmetric garment of FIG. 14A;

FIG. 16A is a front view of an asymmetric garment for the upper body of a wearer having a first material portion, a second material portion, and a third material portion, in accordance with one embodiment of the invention;

FIG. 16B is a rear view of the asymmetric garment of FIG. 16A;

FIG. 18A is a front view of an asymmetric garment for the upper body of a wearer having elasticity elements thereon, in accordance with one embodiment of the invention;

FIG. 18B is a rear view of the asymmetric garment of FIG. 18A;

FIG. 19A is a front view of another asymmetric garment for the upper body of a wearer, in accordance with one embodiment of the invention;

FIG. 19B is a rear view of the asymmetric garment of FIG. 19A;

FIG. 20A is a front view of an asymmetric garment for the lower body of a wearer, in accordance with one embodiment of the invention; and FIG. 20B is a rear view of the asymmetric garment of FIG. 20A.

DETAILED DESCRIPTION

Figure 1A:
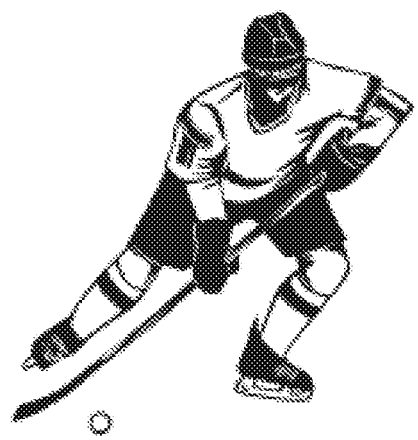
FIG. 1A is a drawing of an ice hockey player executing a shot.
Figure 1B:
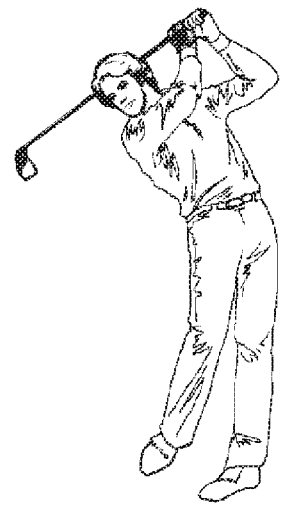
FIG. 1B is a drawing of a golfer executing a shot.
Figure 1C:
FIG. 1C is a drawing of a baseball pitcher throwing a pitch.
Figure 1D:
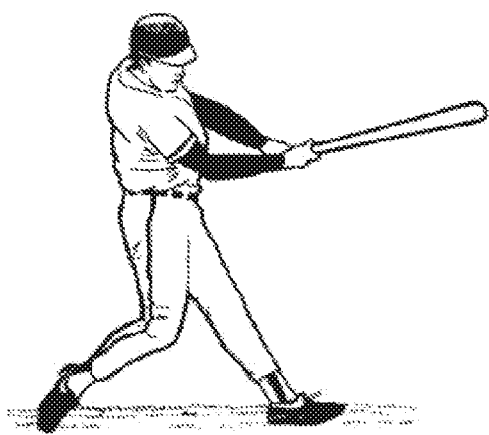
FIG. 1D is a drawing of a baseball batter during a swing.

The invention described herein relates generally to an improved garment for supporting a movement of an athlete during an asymmetrical athletic motion. This may be achieved, for example, by constructing the garment with carefully selected portions being formed from one or more materials specifically adapted to reduce the resistance to movement (e.g., resistance to stretching and/or twisting) provided by the garment and/or to provide support to a specific movement of a wearer. Such garments may be used to reduce the resistance to, and support, athletic motions involving, for example, throwing, kicking, striking, and/or turning. Sports utilizing such asymmetric motions include, but are not limited to, ice hockey, field hockey, lacrosse, baseball, softball, basketball, football, soccer, racquet sports (e.g., tennis, badminton, squash, racquetball, etc), golf, track and field events (e.g., javelin, shot put, discus, hammer, pole vault, hurdling events etc), handball, cricket, water polo, hurling, and archery.

Various garments may be provided with such asymmetrically positioned material construction to enhance the performance of an asymmetric motion utilizing any appropriate muscle group and/or body portion of an athlete. Example garments for the upper body of a wearer include, but are not limited to, long-sleeved shirts, ¾ length-sleeved shirts, short-sleeved shirts, sleeveless shirts, tank tops, arm sleeves, and/or sports bras. Example garments for the lower body of a wearer include, but are not limited to, pants, tights, shorts, leg sleeves, and/or socks. The asymmetrically positioned material construction may also be applied in garments covering both a portion of the upper and lower body of a wearer (e.g., jumpsuits). The garments may be designed to be loose-fitting, "close-to-body" or snug-fitting, or even compression-fitting.

One aspect of the current invention includes a garment specifically designed to reduce and potentially minimize resistance to asymmetric athletic motions and, in some embodiments, even store and release energy supporting the motion, thereby substantially increasing the efficiency of the athlete's movement. For example, various garments according to the current invention include material sections placed asymmetrically over the body or a wearer to allow for additional stretching (with reduced resistance) in targeted portions of the garment (and/or in specific directions) that undergo the most stretch and strain during a repeated asymmetric movement. These garments may, for example, include one or more first materials constituting a majority of the garment, with carefully selected regions of the garment constructed from one or more second materials, or movement promoting materials, having differing structural properties from the one or more first materials. In one embodiment, the one or more second materials may provide less resistance to deformation (e.g., stretching) in one or more directions than the one or more first materials. The second material(s) may in addition, or alternatively, be lighter, more elastic, stronger, and/or possessing a lower friction coefficient than the first material(s). The second material may be positioned on the left side of a garment, the right side of the garment, or even on both sides of the garment. In various embodiments, the second material may also, or alternatively, be positioned only on a front, side, or a rear of the garment. Providing a garment that is specifically designed to reduce and potentially minimize resistance to a repeated asymmetric athletic motion also allows for increased wear resistance of the garment, thereby allowing the garment to maintain its structural integrity, and thereby functionality, longer.

The regions of the garment constructed from the second material(s) may be located over and/or adjacent to the body portion(s) of the wearer that undergo significant movement during the asymmetric motion. For example, the shoulder region providing the force generation for an ice hockey player (e.g., the right shoulder for a right-handed shot) may be covered by a shirt constructed from, or partially constructed from, a second material providing minimal resistance to stretching. As a result, as the hockey stick is drawn back and thereafter driven forward, resistance to the shot by the material of the shirt is minimized. The remainder of the shirt may be constructed from one or more first materials, with the first materials selected for purposes such as, but not limited to, durability, warmth, protection, style, etc.

Constructing garments with one or more first material(s) over a majority of the garment and with one or more second material(s) only on specifically targeted portions selected to enhance the performance of the wearer, allows the garment to be optimized for cost, durability, warmth, protection, style, etc, while still supporting the asymmetric motion repeatedly performed by the wearer. Constructing garments with different material portions having a different coefficient of friction may allows the portions having the larger coefficient of friction (i.e., the first material portions) to grip onto the skin or under-garment of the wearer, while the portions having the lower coefficient of friction (i.e., the second material portion) slide over the skin or under-garment of the wearer and thereby don't produce a significant friction force that could fight against the stretching, twisting, or extension of that portion of the body of the wearer. Such constructions may be advantageous, for example, for use in material portions for sports apparel such as, but not limited to, hockey shooting shirts.

In various embodiments, the one or more first and/or second materials forming part of the garment may include materials such as, but not limited to, cotton, polyester, nylon, spandex, or a combination of two or more of those materials. For example, the first and/or second materials may be formed from a cotton-spandex, polyester-spandex, and/or nylon-spandex blends such as, for example, cotton, polyester, or nylon with spandex for super stretch and recovery in either a circular knit or warp knit construction. In an alternative embodiment, other appropriate knit constructions may be utilized. The second material may be formed from a different material or combination of materials from the first material and/or be formed with different proportions, weaves, and/or orientations of materials from the first material.

In one embodiment, the first and second materials comprise cotton-spandex, polyester-spandex, or nylon-spandex blends with different proportions of spandex therein. For example, by forming the second material from a blend having a higher percentage of spandex than in the first material, the second material will allow for a greater degree of stretch to reduce resistance to the asymmetric athletic motion. In one embodiment, the second material is adapted to preferentially stretch in a limited number of directions and, for example, in only one direction. The first and second material(s) may be selected such that they provide the required support for the asymmetric motion of the athlete while not substantially hindering any symmetric motions carried out by the athlete (e.g., running or skating) while participating in a sport.

The second material can be adapted to stretch equally in all directions, thereby allowing for the multi-directional stretching and deformation of the second material portion supporting the athlete's movement. Alternatively, the second material can be adapted to preferentially stretch in a limited number of directions, and even in only one direction, thereby supporting the specific stretching of the garment in only limited directions. By preferentially stretching in only one direction (or in a limited number of specific directions) the garment may be used to encourage the athlete to turn and/or stretch in a specific direction (i.e., the direction that causes the minimum resistance from the second material), thereby potentially providing a training functionality to the garment. As a result, careful positioning and orientation of selectively stretchable second material portions can actively encourage a wearer to move in a specific direction and manner when performing an asymmetric motion, with this desired direction corresponding to the optimal motion of the wearer when performing the asymmetric movement.

In various embodiments the first and/or second materials may be selected to provide wicking-type functionality and/ or cooling-type functionality. For example, the first material and/or second material can be a wicking material for promoting the wicking of moisture (e.g., sweat) away from the skin of the wearer, thereby enhancing cooling of the wearer during athletic activity. Additionally, or alternatively, one or more of the garment materials may be treated or infused with one or more materials (e.g., Xylitol) specifically designed to discharge thermal heat, control moisture and sweat, and promote the cooling of the wearer through an evaporative effect. An example material for cooling a wearer is Chill Wave from Warrior Sports, Inc. of Warren MI In various embodiments, one or more of the materials in the garment may be treated with an antimicrobial agent to provide antimicrobial or antifungal benefits to the garment.

In various embodiments of the invention, the materials constituting the garment may be connected through any appropriate means including, but not limited to, stitching and/or heat welding, bonding or seamless bonding construction. The connections between different material portions may also, or alternatively, include the use of seam tape or other separate bonding elements. In one embodiment, the first material portion and second material portion are stitched together by a flat-lock stitch. The flat-lock stitch may, for example be formed from a nylon thread.

Figures 2A, 2B:
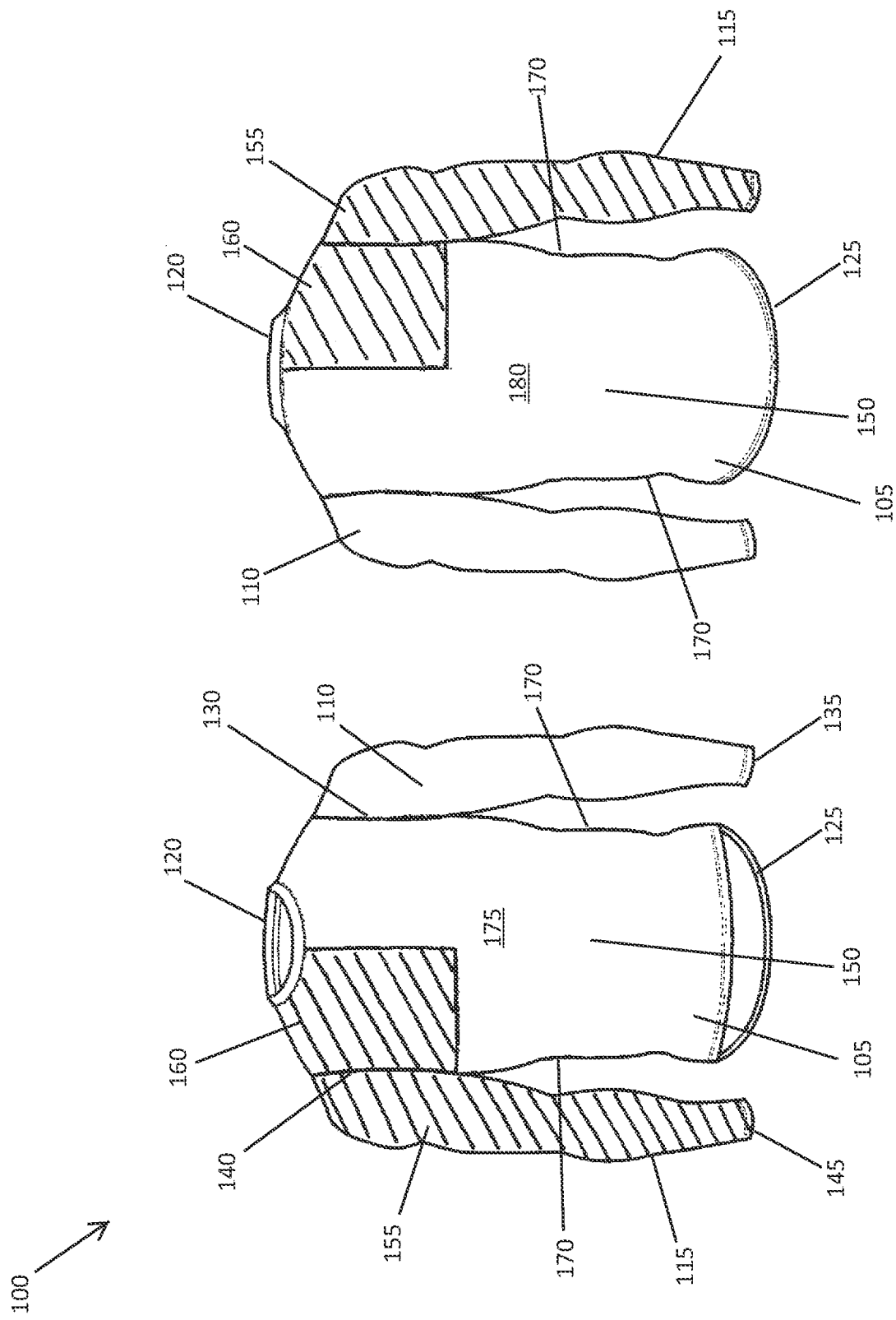
FIG. 2A is a front view of a long-sleeved asymmetric garment for the upper body of a wearer, in accordance with one embodiment of the invention.
FIG. 2B is a rear view of the asymmetric garment of FIG. 2A.

One embodiment of the invention, including an asymmetric garment 100 designed to cover the upper body of a wearer, is shown in FIGS. 2A and 2B. In this embodiment, the garment 100 includes a torso section 105, a first sleeve 110, and a second sleeve 115. In various embodiments, the sleeves may be traditional sleeves or raglan sleeves. The torso section 105 includes a neck opening 120 for the wearer's neck and a torso opening 125 for a lower portion of the wearer's torso in the region of the wearer's waist. The first sleeve 110 is connected to the torso section 105 at a first end 130 thereof at the region of the shoulder of the wearer, and has an opening for the wearer's hand at a second end 135 thereof in the region of the wearer's wrist. Similarly, the second sleeve 115 is connected to the torso section 105 at a first end 140 thereof, at the region of the shoulder of the wearer, and has an opening for the wearer's hand at a second end 145 thereof in the region of the wearer's wrist.

The garment 100 includes a first material portion 150 which forms at least a portion of the first sleeve 110 and at least part of the torso section 105, and a second material portion 155 which forms at least a portion of the second sleeve 115 and at least a portion of the torso section 105 proximate the second sleeve 115. The second material portion 155 is constructed from a material adapted to provide a lesser resistance to stretching, twisting, and/or other deformation than the material forming the first material portion 150, thereby reducing the resistance to an asymmetric shoulder and arm motion of the wearer (e.g., swinging an ice hockey stick, baseball bat, tennis racquet, etc., or throwing an object such as a baseball or football).

Figure 5B:
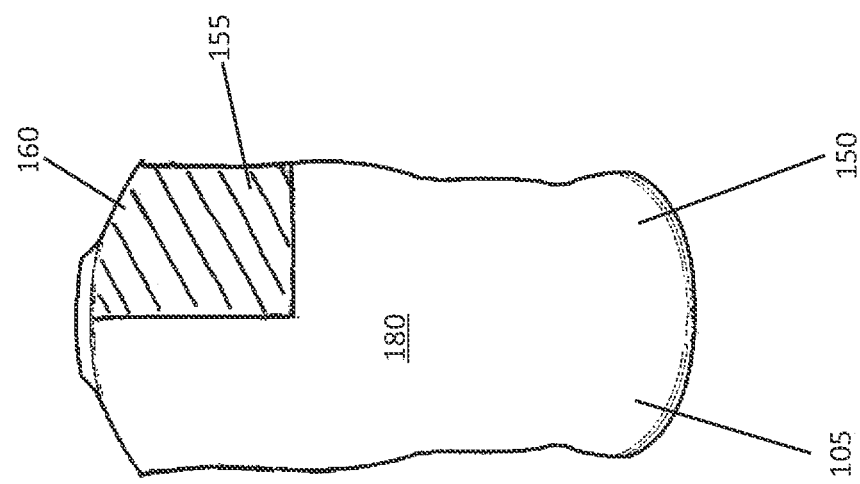
FIG. 5B is a rear view of the asymmetric garment of FIG. 5A.
Figure 5A:
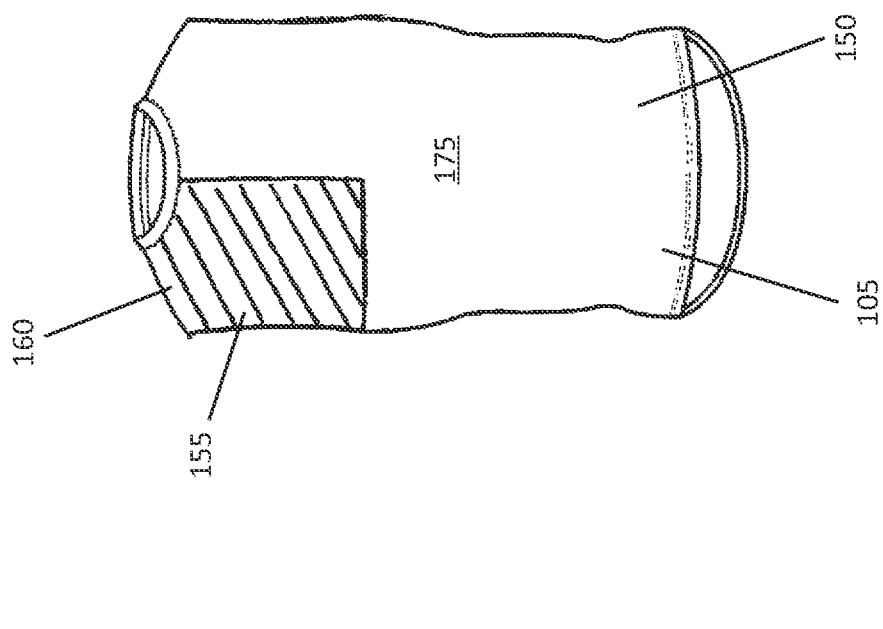
FIG. 5A is a front view of a sleeveless asymmetric garment for the upper body of a wearer, in accordance with one embodiment of the invention.

The second sleeve 115 may be formed entirely from the second material. Alternatively, only a portion of the second sleeve 115 (such as, but not limited to, the upper portion proximate the first end 140, an inner side proximate the torso section 105, and or an outer side away from the torso section 105) may be formed from the second material. An example embodiment with only a portion of the second sleeve 115 formed from the second material is shown in FIGS. 3A and 3B. In various embodiments, the garment 100 may be long-sleeved, as shown in FIGS. 2A to 3B, ⅞ length-sleeved, short-sleeved, as shown in FIGS. 4A and 4B, or sleeveless, as shown in FIGS. 5A and 5B.

In the embodiment of FIGS. 2A and 2B, the second material portion 155 includes a shoulder section 160 extending over at least a portion of the front 175 and back 180 of the torso section 105. The shoulder section 160 may be of any appropriate size and shape, and may be adapted to extend over any appropriate body portion and/or muscle group of the wearer. In various embodiments, the shoulder section 160 can extend over a greater region of the back 180 than the front 175 of the garment 100, or vice versa. The shoulder section 160 may be shaped differently on the back 180 of the garment 100 compared to the front 175.

In one embodiment of the garment 100, as shown in FIGS. 6A and 6B, the second material portion 155 may include a rear section 165 extending from the shoulder section 160 substantially vertically down the back 180 of the torso section 105 such that the second material extends from the neck opening 120 to the lower torso opening 125. The rear section 165 may extend vertically, substantially vertically, or at an acute angle to the vertical plain. The rear section 165 may be formed from a single expanse of the second material or from a plurality of sections of second material. In one embodiment, the rear section 165 may include a plurality of parallel, substantially parallel, or non-parallel sections extending on the back 180 of the garment 100. The plurality of sections forming the rear section 165 may be arranged either symmetrically or asymmetrically about a central vertical plain 185 of the garment 100.

In one embodiment the rear section 165 may extend only partially down the back 180 of the garment 100, and may extend either from the neck opening 120, the torso opening 125, or in an intermediate region between the neck opening 120 and the torso opening 125. An example garment 100 having a second material portion 155 including a rear section 165 extending only partially down the back 180 of the garment 100 is shown in FIGS. 7A and 7B. The rear section 165 may be of any appropriate width and shape. The rear section 165, or sections, may either adjoin other sections of second material or be separate portions surrounded by first material. In one embodiment, the rear section 165 may cover the majority of, or substantially the entire, back 180 of the torso section 105.

As shown in FIGS. 6A and 6B, the second material portion 155 may also includes a side section 190 extending around at least a portion of a side 170 of the torso section 105 on the second sleeve 115 side of the garment 100. The side section 190 extends helically downwards from the back 180 of the torso section 105 to the front 175 of the torso section 105. The side section 190 tapers from a first width on the rear 180 of the garment 100 (where it adjoins the second material positioned on the rear 180 of the garment 100) to substantially a point on the front 175 of the garment 100.

In an alternative embodiment, the side section 190 may taper to a different degree from a first width to a second width, be of a constant width over part or all of its full extent, or vary in width in any other appropriate manner over its extent. The side section 190 may extend at any acute angle to the horizontal plain, or may extend horizontally or substantially horizontally. In an alternative embodiment, the side section 190 can extend vertically, or substantially vertically, down one or more sides 170 of the garment 100. The side section 190 may be of any appropriate length and width and may extend over any appropriate section of the side 170 of the torso. The side section 190, or sections, may either adjoin other sections of second material or be separate portions surrounded by first material. The side section 190 may be formed from a single expanse of the second material or from a plurality of sections of second material.

In one embodiment, the side section 190 may include a plurality of parallel, substantially parallel, or non-parallel sections extending around the side of the garment 100. An example garment having a second material portion 155 including a plurality of side sections 190 extending helically in parallel about the side 170 of the garment 100 proximate the second sleeve 115 is shown in FIGS. 7A and 7B.

In one embodiment, the second material portion 155 is formed from a plurality of sections of second material connected to form a continuous expanse, as shown, for example, in FIGS. 2A and 2B. In an alternative embodiment, the second material portion 155 is formed as a single, unitary, expanse of the second material, as shown, for example, in FIGS. 8A and 8B. The single, unitary, expanse of the second material may, for example, be formed as a flat piece and thereafter stitched at one or more seams to form the finished section of the garment.

Figure 9B:
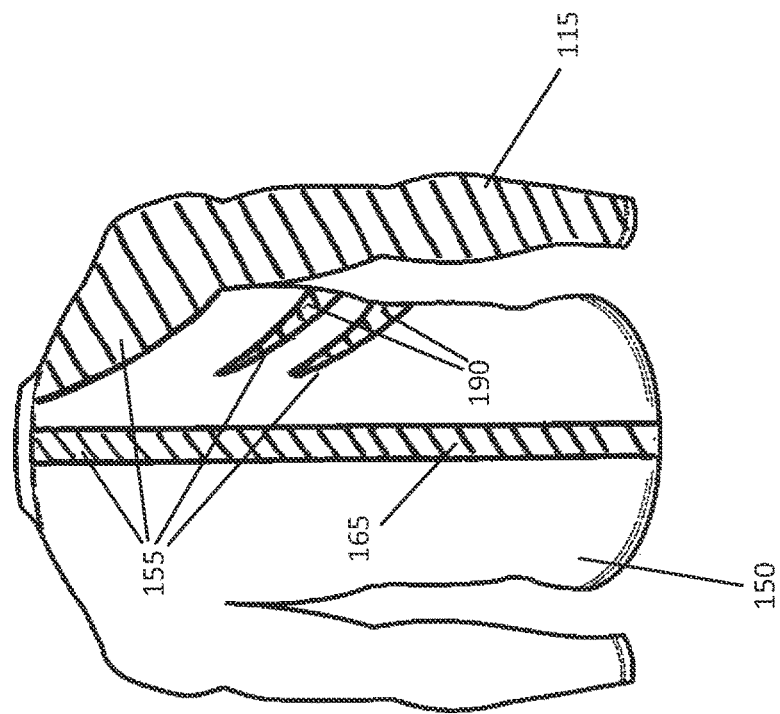
FIG. 9B is a rear view of the asymmetric garment of FIG. 9A.
Figure 9A:
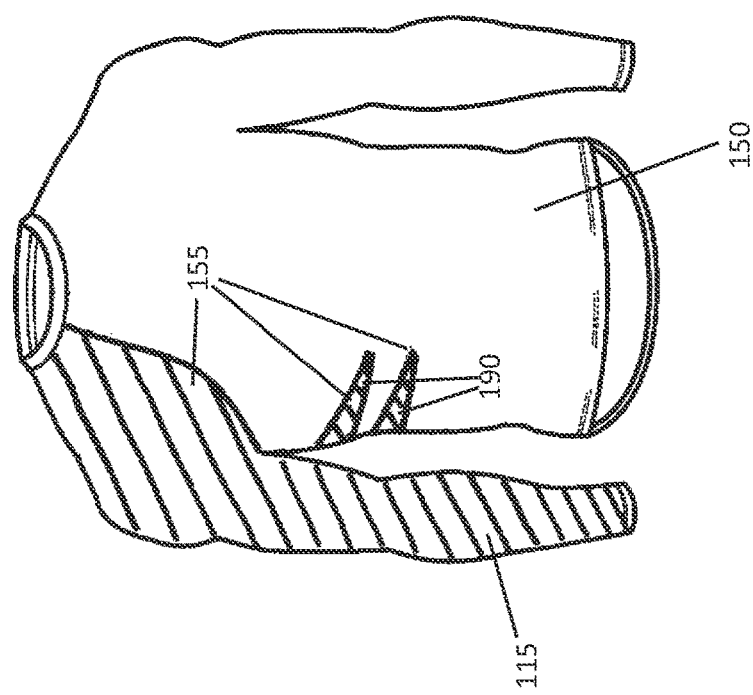
FIG. 9A is a front view of an asymmetric garment for the upper body of a wearer having a plurality of spaced apart regions of second material, in accordance with one embodiment of the invention.

In one embodiment the second material portion 155 may include a plurality of separate portions of second material with the first material, or another material, spaced therebetween. An example garment 100 including a second material portion 155 including a plurality of spaced apart sections, with the first material 150 extending therebetween, is shown in FIGS. 9A and 9B. Further embodiments may include a combination of separate elements, multi-sectioned elements, and/or unitary elements, depending upon the specific functionality required of the garment.

Figure 10B:
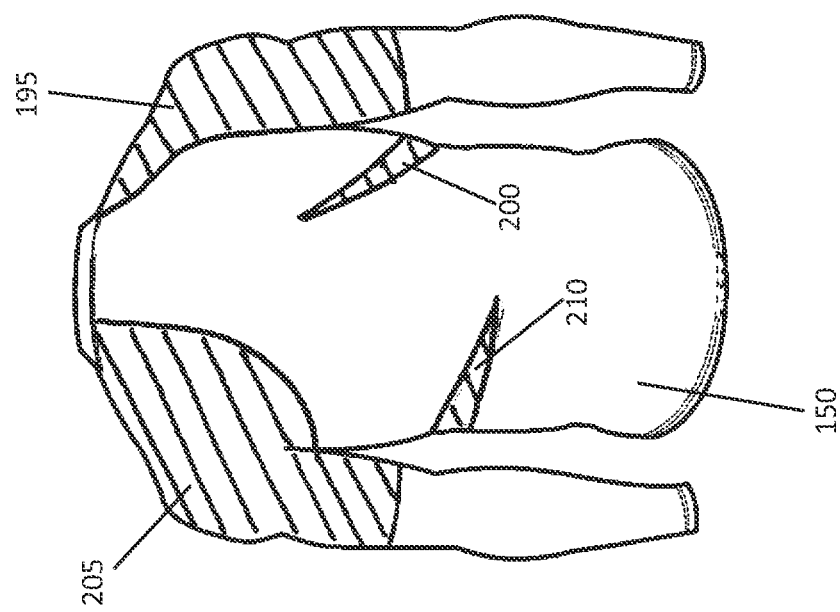
FIG. 10B is a rear view of the asymmetric garment of FIG. 10A.
Figure 10A:
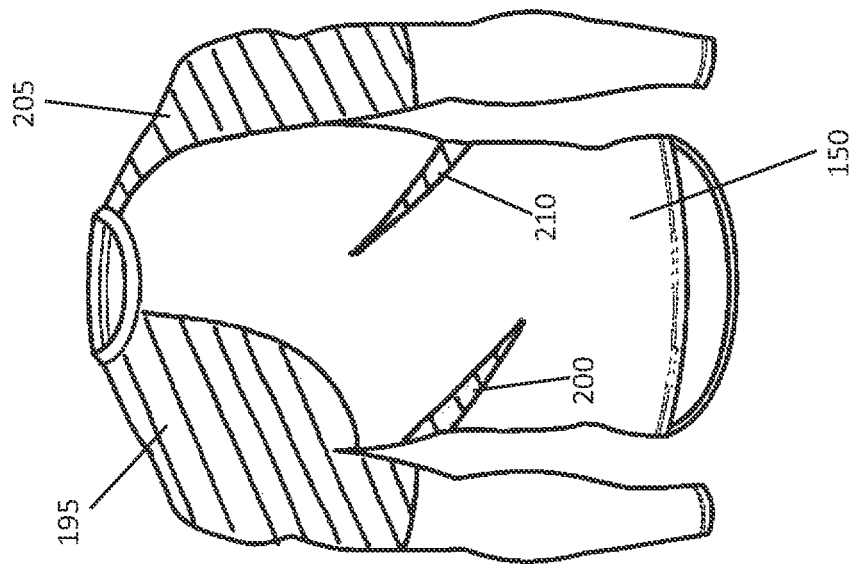
FIG. 10A is a front view of another asymmetric garment for the upper body of a wearer having a plurality of spaced apart regions of second material, in accordance with one embodiment of the invention.

The second material portion 155 may be positioned only on one side of the garment 100 (i.e., extending only on, or substantially only on one side of the central vertical plain 185). Alternatively, the second material portion 155 may be asymmetrically arranged on both sides of the garment 100, for example with asymmetric second material portions 155 on both shoulders and/or arms, and/or on both sides of the torso section 105. An example embodiment having second material portions 155 extending over both sides of the garment 100 is shown in FIGS. 10A and 10B. In this embodiment, the second material portion 155 includes a right shoulder portion 195, a right side portion 200, a left shoulder portion 205, and a left side portion 210, with the left and right sides arranged asymmetrically with respect to each other to specifically support an asymmetric motion of a wearer that includes the movement and stretching of both the left and right sides of the garment 100.

In one embodiment, the second material portion 155, or portions, may be arranged asymmetrically with respect to the front, side, and/or back of the garment 100. An example garment 100 having a second material portion 155 arranged asymmetrically with respect to the central vertical plain 185, and also arranged only on the side 170 and back 180 of the garment (but not on the front 175) is shown in FIGS. 11A and 11B. The second material portion 155 includes a rear section 165, a vertical side section 190, and a shoulder section 160 extending only on the rear side of the shoulder. Here, the second material portion 155 is located only on the torso section 105, and not on either of the sleeves (110, 115). In alternative embodiments, any appropriate asymmetrically sized, shaped, and located second material portion(s) 155 may be incorporated into the garment 100, depending upon the specific athletic motion being supported.

In one embodiment of the invention, as shown in FIGS. 12A and 12B, the sleeves of the garment 100 may be raglan sleeves, with a first raglan sleeve 215 formed from the first material, and a second sleeve 220, or a portion thereof, formed from the second material, with a torso portion 225 therebetween. In an alternative embodiment, only one of the first sleeve 215 and the second sleeve 220 may be a raglan sleeve. The first raglan sleeve 215 and second sleeve 220 include a single expanse of material covering at least a portion of the arm of a wearer and extending as a single material portion from the arm of the wearer, over the shoulder of the wearer, and fully to the collar at a neck opening 120 of the garment 100, with a diagonal seam 230 connecting the sleeve material to the torso 205 of the garment 100 and extending from the underarm to the collarbone of the garment 100. As such, a raglan sleeve includes a single expanse of material extending over both the arm of the wearer and a shoulder portion of the torso of the wearer. In this embodiment, the second material portion 155 can form one of the raglan sleeves (e.g., the right sleeve 220 as shown in FIGS. 12A and 12B), or a portion thereof, and, optionally, include one or more additional sections 235 of second material extending over at least a portion of the torso portion 205.

Figure 15A:
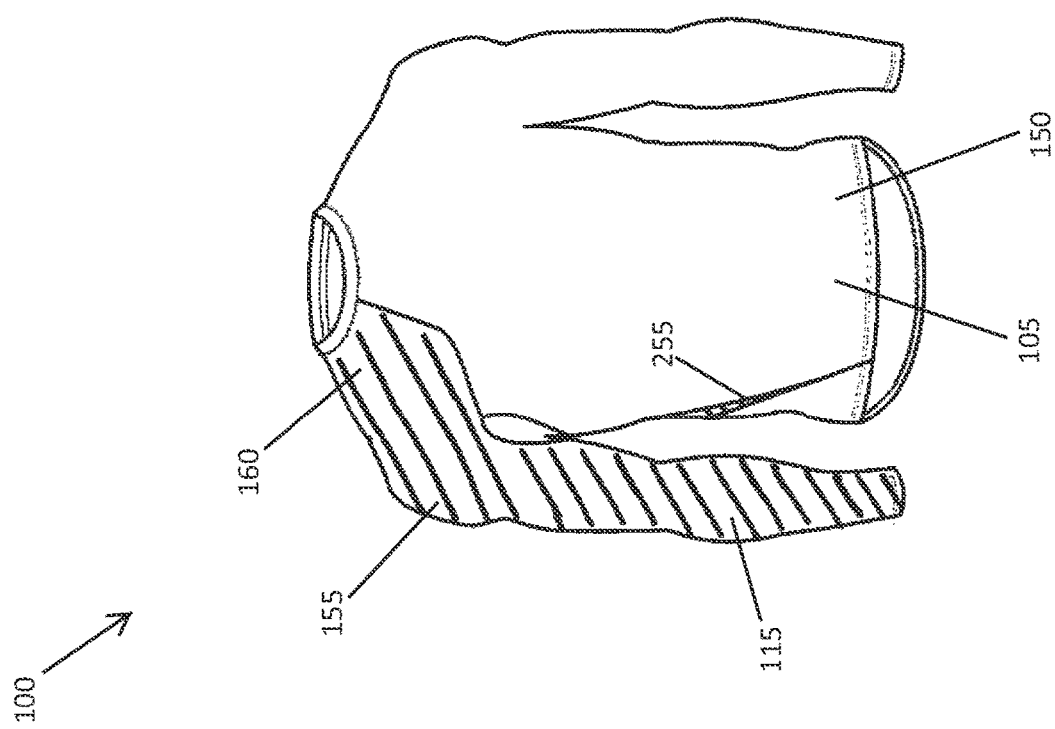
FIG. 15A is a front view of another asymmetric garment for the upper body of a wearer, in accordance with one embodiment of the invention.
Figure 15B:
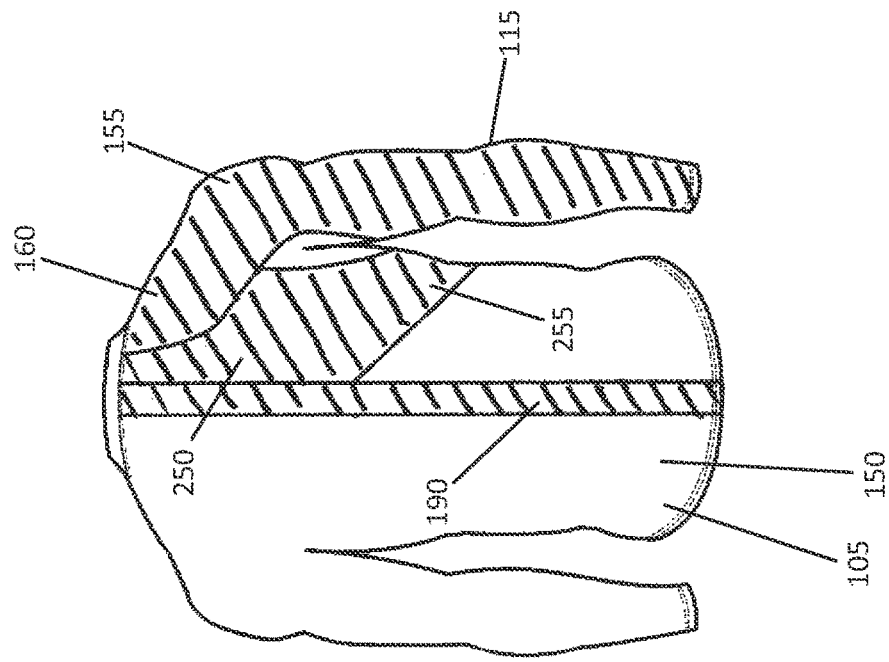
FIG. 15B is a rear view of the asymmetric garment of FIG. 15A.

FIGS. 13A and 13B show a garment 100 including a second material portion 155 extending over the second sleeve 115 and shoulder portion 160, with a rear portion 250 extending down from the second sleeve 115 and forming a helically extending side portion 255 extending around the side of the torso section 105 and tapering to a point on the front 175 of the garment 100 at the torso opening 125. FIGS. 14A and 14B show a garment 100 including a second material portion 155 extending over the second sleeve 115 and shoulder portion 160, with an elongate rear portion 190 extending vertically down the rear 180 of the garment 100 from the neck opening 120 to the torso opening 125. FIGS. 15A and 15B show a garment 100 including a second material portion 155 including second material extending over the second sleeve 115, a rear portion 250 with a helically extending side portion 255, and an elongate rear portion 190.

Various other embodiments of the invention may include garments having second material portions 155 extending over any appropriate regions of the garment in any appropriate configuration, depending upon the physiology of the wearer, the specific asymmetric motion being supported, and the degree of support required. For example, one or more second material portions 155 may be positioned, in any appropriate size and shape, on regions of the upper body such as the arm, shoulder, side, chest, back, and/or waist of the athlete.

One embodiment of the invention, as shown in FIGS. 16A and 16B, may include a third material portion 260 arranged on the opposite side of the garment 100 to the second material portion 155. This third material portion 260 may be arranged in a similar configuration to the second material portion 155, for example to provide a level of symmetry to the aesthetic look of the garment 100 and/or to provide a substantially symmetric shape to the different portions of the garment 100 to simplify manufacturing of the garment 100. For example, the third material portion 260 may be colored to match the color of the second material portion 155 (to provide a certain degree of aesthetic symmetry to the garment 100), but be manufactured from a different material from the second material (thereby providing the asymmetric material properties required in certain embodiments of the invention). The third material portion 260 may be constructed, for example, from the first material, or from a material different from both the first material and the second material.

In the embodiment of FIGS. 16A and 16B, the third material portion 260 includes at least a portion of the first sleeve 110, at least a portion of the torso section 105 proximate the first sleeve 110, a rear section 265 abutting the first sleeve 110 and extending down from the left shoulder, and a side section 270 extending helically around at least a portion of a side of the torso section proximate the first sleeve 110. In FIGS. 16A and 16B the helically extending side section 270 extends over the front 175 of the garment 100 to a greater degree than the side section 255 of the second material portion 155 (i.e., it extends further towards the central vertical plain 185 of the garment 100 than the side section 255 of the second material portion 155), thereby providing a noticeable asymmetrical visual aspect to the garment 100. In an alternative embodiment, the third material portion 260 may be arranged completely symmetrically with the second material portion 155 (i.e., arranged as a mirror image of the second material portion 155 on the other side of the central vertical plain 185 of the garment 100), or be arranged in any appropriate degree of asymmetry with the second material portion 155.

In one embodiment, the third material portion 260 can be formed from a material having an intermediate degree of resistance to stretching, twisting, and/or other deformation when compared to the first material portion 150 and second material portion 155. Alternatively, the third material portion 260 can be formed from a material having an greater or lesser degree of resistance to stretching, twisting, and/or other deformation (and/or lesser or greater coefficient of friction) than both the first material portion 150 and second material portion 155. As a result, the third material portion 260 can be specifically designed to provide additional support to and/or control of the specific asymmetric motion being carried out by the wearer.

Figures 17A, 17B:
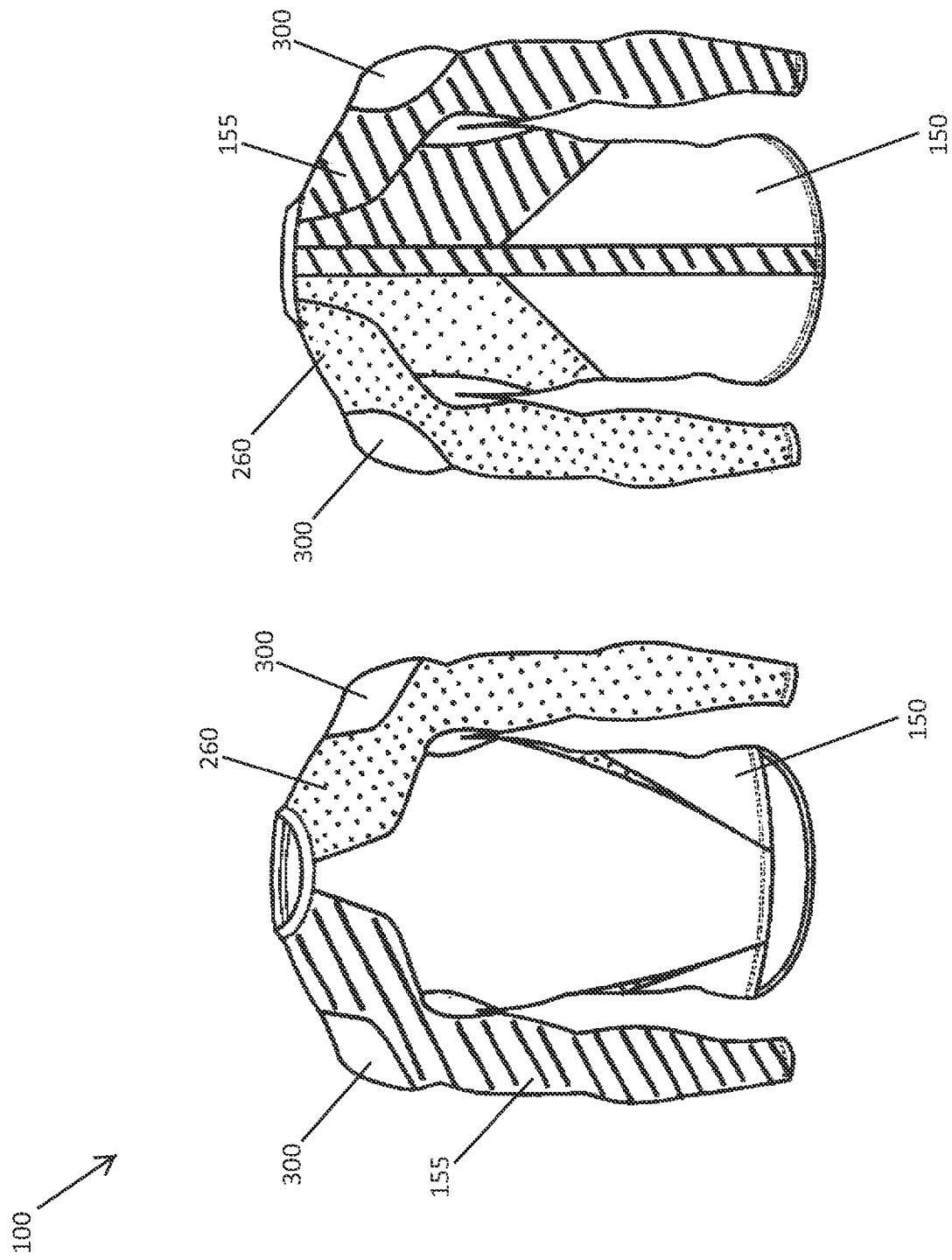
FIG. 17A is a front view of an asymmetric garment for the upper body of a wearer having support elements thereon, in accordance with one embodiment of the invention.
FIG. 17B is a rear view of the asymmetric garment of FIG. 17A.

In one embodiment of the invention, as shown in FIGS. 17A and 17B, the garment 100 includes supporting elements 300 extending over at least a portion of the shoulders of the garment. The supporting elements 300 may, for example, provide reinforcement to portions of the garment 100 that undergo significant stretching, twisting, and/or deformation during use, that are subject to significant wear during use (e.g., as they rub against protective pads or other structures or garments underlying or overlying the garment 100) or provide protection to various body portions of the wearer. The supporting elements 300 may be constructed the same material as either the first material or second material, or from materials such as, but not limited to, polyester blends, cotton blends or other synthetic or natural fibers.

In an alternative embodiment, the supporting elements 300 may be positioned over only one shoulder of the garment 100, or may be positioned over any other appropriate position on the garment 100, for example to support specific regions of the garment that undergo the most deformation during use and/or to overlay specific regions of the wearer's body that undergo significant wear and/or would benefit from additional protection during use (e.g., an elbow, forearm, neck, back, or chest of a garment for the upper body, or a hip, shin, thigh, knee, or rear of a garment for a lower body portion). The supporting elements 300 may be positioned on an outside surface of the garment 100, and interior surface of the garment 100, or between various layers of the garment 100. Any number and/or arrangement of supporting elements 300 may be used, depending upon the specific requirements of the garment.

In one embodiment, the one or more supporting elements 300 may be positioned on the exterior and/or interior of the garment 100 to provide a non-slip surface on the garment 100. This may be advantageous, for example, when the garment is to be worn under padding or other protective clothing, with the supporting elements 300 providing a non-slip surface to ensure that the padding remains in place over the garment 100. In this embodiment, the supporting elements 300 may be manufactured from one or more polymeric elements such as, but not limited to, heat bonded material, silicone or rubber or graphic/print application.

In one embodiment, the garment 100 includes one or more elasticity elements 310 adapted to support a movement of the wearer during an asymmetrical athletic motion. An example garment 100 having elasticity elements 310 positioned on a front 175 thereof is shown in FIGS. 18A and 18B. The elasticity elements 310 can be positioned on a first area of the garment 100 to store energy by elastic elongation under a first movement of a portion of the body of the wearer and to release the stored energy under a second movement of the portion of the body in an opposite direction. As a result, the elasticity elements 310 can actively store and release energy during the asymmetric movement to increase the efficiency of the movement and potentially increase the power generated by the movement.

The elasticity elements 310 may be positioned on the exterior and/or interior of the garment 100, or positioned between two layers of material in the garment 100. In one embodiment, the elasticity elements 310 may be injected into, or otherwise infused with, one or more layers of the garment 100. In various embodiments the elasticity elements 310 may be affixed to the garment by any appropriate means such as, but not limited to, stitching, heat-bonding, chemical bonding, or by injection.

In various embodiments, elasticity element(s) 310 can be of any appropriate size, shape, and/or orientation depending upon the specific asymmetric motion being supported. The elasticity element(s) 310 can be positioned on the front, rear, and/or side of the garment and can overlay, underlay, or be incorporated into the first material, second material, and/or a third material. In one embodiment, the elasticity element(s) 310 can also perform the function(s) of a supporting element 300. In an alternative embodiment, the elasticity element(s) 310 and supporting element(s) 300 are separate elements of the garment. In various embodiments the elasticity element(s) 310 and supporting element(s) 300 can be arranged either symmetrically or asymmetrically on the garment.

In an alternative embodiment, a second material portion may be located symmetrically on a garment, while the one or more elasticity element(s) 310 and/or supporting element(s) 300 are arranged asymmetrically.

Another example garment 100 incorporating an asymmetric material construction can be seen in FIGS. 19A and 19B. In this embodiment, a second material portion 155 extends over portions of the second sleeve 115, the second material portion 155 including a lower sleeve portion 162 separated from an upper sleeve portion 163 by an intermediate sleeve portion 164 of a separate material (e.g., a first material portion 150). The second material portion 155 also includes a shoulder portion 160 and a rear portion 180 forming a rear panel 182 extending over substantially all of the rear 180 of the garment 100. In an alternative embodiment the rear panel 182 can extend over any appropriate area, and be of any appropriate shape and configuration, on the back 180 and/or front 175 of the garment 100. The garment 100 further includes side sections 190, with lower side panels 191 extending around both a left and right side of the torso section 105, and an upper side panel 192 (separated from the lower side panel 191 by an intermediate side portion 193 of a different material, such as a first material portion 150) extending only around one side of the garment 100 on the side proximate the second sleeve 115.

As discussed above, the asymmetric material construction can be integrated into any appropriate garment to support a variety of asymmetric athletic movements. FIGS. 20A and 20B, for example, show a garment 400 comprising a pair of pants having a torso section 405, a first leg 410 and a second leg 415. The pants 400 include a torso opening 420 for a lower portion of the wearer's torso in the region of the wearer's waist, and further include a first leg opening 425 at a lower end of the first leg 410, and a second leg opening 430 at the lower end of the second leg 415. The pants further include a first material portion 150 making up a majority of the garment, with a second material portion 155 positioned at specific locations on the pants 400 to reduce the resistance by the garment to an asymmetric motion of the legs of the wearer. In the embodiment of FIGS. 20A and 20B, the second material portion 155 includes a rear section 435 positioned on the back 440 or the pants 400 and a side section 445 positioned on an outer side 450 of the second leg 415 of the pants 400. In this embodiment, no second material portion 155 is placed on the front 455 of the pants 400.

As with the garments described above, various embodiments of garments for the lower body of a wearer may include second material portions covering any appropriate region, or regions, of the garment. In addition, garments for the lower body of a wearer may include one or more supporting element and/or elasticity element.

It should be understood that alternative embodiments, and/or materials used in the construction of embodiments, or alternative embodiments, are applicable to all other embodiments described herein. It should also be understood that, while many of the examples described herein show the second material portion positioned either exclusively or mainly on a right side of a garment, the invention relates equally to the positioning of second material portion on either or both or the left and right side of a garment, and/or primarily on the front or rear of the garment.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. An asymmetric garment for at least a portion of an upper body of a wearer, the garment comprising:
   a torso section comprising a neck opening for a wearer's neck, a lower torso opening for a lower portion of the wearer's torso, and an upper torso end for an upper portion of the wearer's torso, wherein at least a portion of the torso section comprises a first material;
   a first sleeve comprising the first material and a first end, wherein the first sleeve is connected to the upper torso end of the torso section at the first end; and
   a second sleeve comprising (a) a second end, wherein the second sleeve is connected to the upper torso end of the torso section at the second end with a seam and (b) a single, unitary expanse of a second material comprising (i) a second arm region configured to extend completely around a second arm of the wearer and at least partially cover the second arm of the wearer and (ii) a second shoulder region configured to cover at least a portion of a second shoulder of the wearer and extending to a second collar portion at the neck opening of the torso section,
   wherein (i) the seam defines the asymmetry of the garment, (ii) the single, unitary expanse of the second material is adapted to provide reduced resistance to asymmetrical shoulder and arm motion at the second shoulder region, (iii) a stretchability of the second material is greater than a stretchability of the first material, (iv) a first segment of the seam extends from the second collar portion directly towards the lower torso opening, (v) a second segment of the seam extends from the upper torso end proximate the second arm region towards a center region of the upper torso end, and (vi) the first and second segments meet proximate the center region of the upper torso end.

2. The garment of claim 1, wherein the torso section further comprises a third material portion comprising a side section extending around at least a portion of a side of the torso section proximate at least one of the first sleeve and the second sleeve.

3. The garment of claim 1, wherein at least one of the first material or the second material comprises material adapted to provide at least one of a wicking property and cooling property.

4. The garment of claim 1, wherein at least one of the first material or the second material comprises cotton, polyester, nylon, spandex, a polyester-spandex blend, a nylon-spandex blend, a cotton-spandex blend, or a combination of two or more materials thereof.

5. The garment of claim 1, further comprising one or more supporting elements extending over or underlying at least a portion of at least one shoulder of the garment.

6. The garment of claim 5, wherein the one or more supporting elements comprise reinforcement elements comprising the first material or second material.

7. The garment of claim 5, wherein the one or more supporting elements comprise one or more non-slip elements on an outer surface of the garment.

8. The garment of claim 7, wherein the non-slip elements comprise a polymeric material selected from the group consisting of silicone and rubber.

9. The garment of claim 1, further comprising one or more elasticity elements adapted to support a movement of the wearer during asymmetrical athletic motion.

10. The garment of claim 9, wherein the one or more elasticity elements are disposed on a first area of the garment to store energy by elastic elongation under a first movement of a portion of the body of the wearer and to release the stored energy under a second movement of the portion of the body in an opposite direction.

11. The garment of claim 1, wherein the seam comprises at least one of stitching, flat-lock stitching, bonding, heat welding, use of seam tape, use of at least one separate bonding element, or any combination thereof.

12. The garment of claim 11, wherein the flat-lock stitching comprises nylon thread.

13. The garment of claim 1, wherein the torso section comprises a material differing in at least one material property from at least one of the first material or the second material.

14. The garment of claim 1, wherein the first sleeve is connected to the torso section at a raglan sleeve seam extending over a first shoulder region of the torso section to a first collar portion disposed at the neck opening of the torso section.

15. The garment of claim 14, wherein the seam is arranged asymmetrically with respect to the raglan sleeve seam connecting the first sleeve to the torso section, so as to provide reduced resistance to the asymmetrical shoulder and arm motion at the second shoulder region.

16. The garment of claim 14, wherein the raglan sleeve seam comprises at least one of stitching, flat-lock stitching, bonding, heat welding, use of seam tape, use of at least one separate bonding element, or any combination thereof.

17. The garment of claim 1, wherein the first sleeve comprises a single, unitary expanse of a first material configured to extend completely around a first arm of the wearer and to at least partially cover the first arm of the wearer.

18. The garment of claim 1, wherein the second shoulder region comprises a front section and a back section that are each configured to extend only partially over the torso of the wearer proximate the second arm region.

19. The garment of claim 1, wherein the seam defines the asymmetry of the garment so as to provide reduced resistance to the asymmetrical shoulder and arm motion at the second shoulder region.

20. The garment of claim 1, wherein the seam meets the second sleeve at the upper torso end of the torso section.

21. The garment of claim 1, wherein a spandex content of the second material is higher than a spandex content of the first material.

22. The garment of claim 1, wherein the second material provides less resistance to at least one of stretching, twisting, or deformation than the first material.

23. The garment of claim 1, wherein a coefficient of friction of the second material is lower than a coefficient of friction of the first material.

* * * * *